(12) United States Patent
Shimada

(10) Patent No.: US 12,393,376 B2
(45) Date of Patent: Aug. 19, 2025

(54) CONTROL METHOD FOR EXECUTING APPLICATION STORED IN INFORMATION PROCESSING APPARATUS AND PROVIDING PRINT SETTING SCREEN TO DISPLAY AN OBTAINED ICON IMAGE

(71) Applicant: CANON KABUSHIKI KAISHA, Tokyo (JP)

(72) Inventor: Kazushige Shimada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/438,201

(22) Filed: Feb. 9, 2024

(65) Prior Publication Data

US 2024/0272838 A1 Aug. 15, 2024

(30) Foreign Application Priority Data

Feb. 14, 2023 (JP) ................................. 2023-020519

(51) Int. Cl.
*G06F 3/12* (2006.01)
*H04N 1/00* (2006.01)

(52) U.S. Cl.
CPC .......... *G06F 3/1205* (2013.01); *G06F 3/1228* (2013.01); *H04N 1/00424* (2013.01)

(58) Field of Classification Search
CPC .. G06F 3/1205; G06F 3/1228; H04N 1/00424
USPC ...................................................... 358/1.15
See application file for complete search history.

(56) References Cited

U.S. PATENT DOCUMENTS

| 9,602,678 B2 * | 3/2017 | Abe ....................... G06K 15/00 |
| 2006/0170967 A1 * | 8/2006 | Maki ....................... H04L 41/22 |
| | | 358/1.15 |
| 2012/0229851 A1 * | 9/2012 | Nishida ................. G06F 3/1267 |
| | | 358/1.15 |
| 2013/0163023 A1 * | 6/2013 | Tomono ............. H04N 1/00411 |
| | | 358/1.13 |
| 2017/0186134 A1 * | 6/2017 | Fujiwara ............ H04N 1/00474 |
| 2019/0037086 A1 * | 1/2019 | Tokuchi ............. H04N 1/00424 |

FOREIGN PATENT DOCUMENTS

JP 2004310154 A 11/2004

* cited by examiner

*Primary Examiner* — Allen H Nguyen
(74) *Attorney, Agent, or Firm* — Canon U.S.A., Inc. IP Division

(57) ABSTRACT

A control method according to an embodiment is a control method implemented by executing an application stored in an information processing apparatus and providing a print setting screen for allowing a user to set print settings used when a driver in the information processing apparatus generates a print command to be provided for printing at a printer, the control method including: receiving an event from an operating system of the information processing apparatus; obtaining, in response to the event being received, information about a location where data of an icon indicating the printer is stored, from an external apparatus via a network; obtaining an icon image, based on the obtained information about the location; and causing a display unit of the information processing apparatus to display the obtained icon image.

8 Claims, 26 Drawing Sheets

FIG. 2
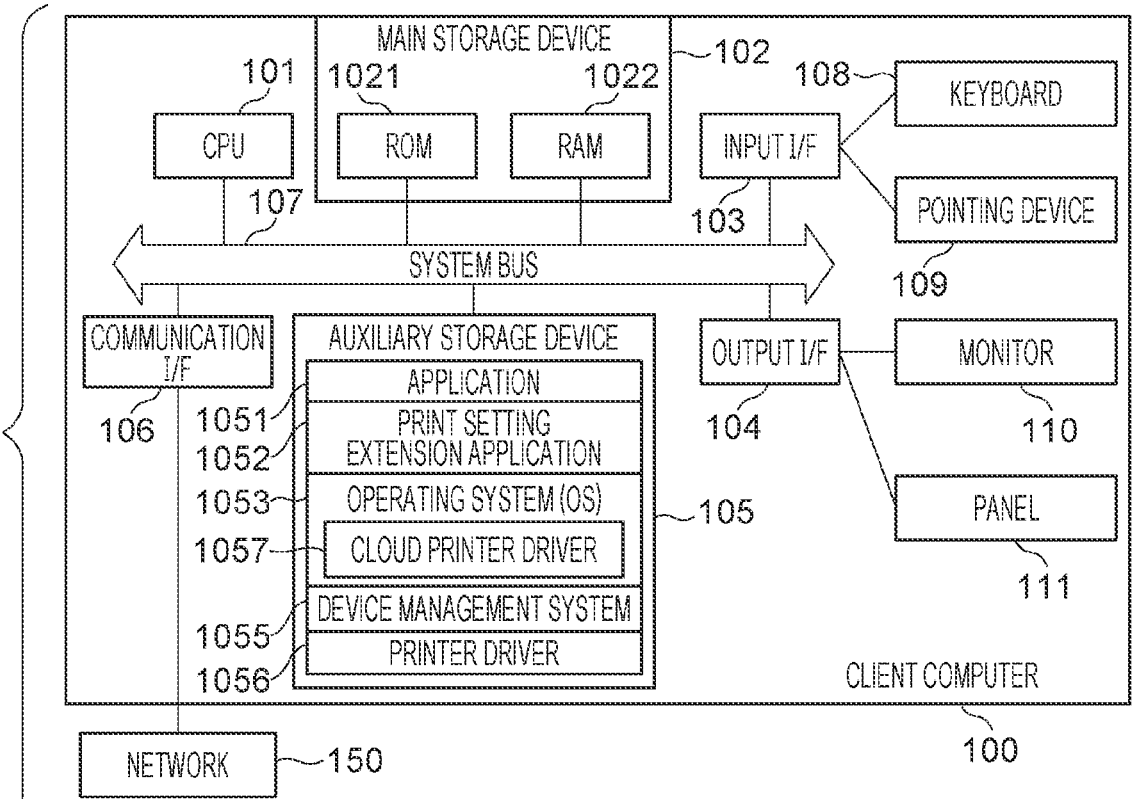
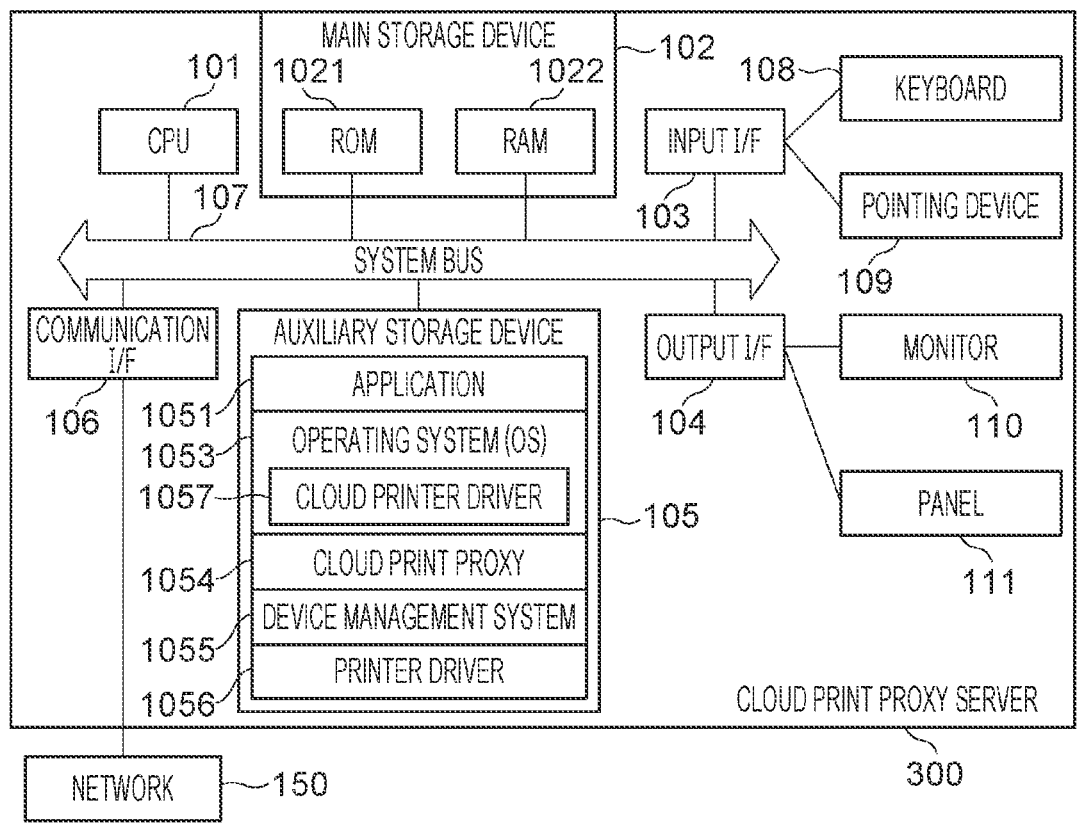

FIG. 7
| PRINTER NAME | HWID | ICON |
|---|---|---|
| iR-ADV CCCC | iR-ADV_CCCC61B1 | 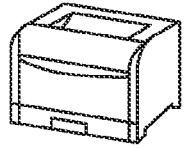 |
| iR-ADV XXXX | iR-ADV_XXXXD80D | 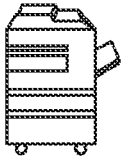 |
| AAAA | AAAACF39 | 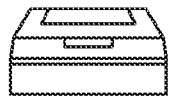 |
| YYYY | YYYY62B5 | 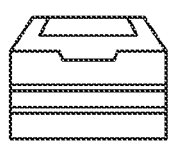 |

CONTROL METHOD FOR EXECUTING APPLICATION STORED IN INFORMATION PROCESSING APPARATUS AND PROVIDING PRINT SETTING SCREEN TO DISPLAY AN OBTAINED ICON IMAGE

BACKGROUND

Field of the Disclosure

The present disclosure relates to a control method for an information processing apparatus, a non-transitory computer-readable storage medium, and an information processing apparatus.

Description of the Related Art

It has been a common practice to perform printing by using a driver provided by a printer vendor (printer manufacturer). Recently, it has become possible to perform printing by using a standard driver provided by a manufacturer that provides the OS without using a driver provided by a printer vendor. For example, Windows (registered trademark) is equipped with a standard driver called IPP Class Driver. Android (registered trademark) is equipped with a standard driver called Mopria (registered trademark). iOS (registered trademark) is equipped with a standard driver called AirPrint (registered trademark) as one function of the OS. These standard drivers are drivers that issue print commands conforming to a printing protocol called IPP (Internet Printing Protocol). Therefore, a printer that conforms to IPP can receive such print commands and perform printing. A characteristic of the standard drivers is their ability to cause a plurality of models of printers, from a plurality of printer vendors, conforming to the printing protocol to perform printing. That is, the standard drivers are compatible with the plurality of models of printers.

Japanese Patent Laid-Open No. 2004-310154 describes an information processing apparatus capable of communicating with a printer, in which a driver installed in the information processing apparatus obtains from the printer, image data of an icon representing the external appearance of the printer (see Japanese Patent Laid-Open No. 2004-310154, FIG. 7). The image data of the icon is provided to the OS.

Accordingly, the OS displays the icon on a printer management screen (for example, a screen for devices and printers) provided by the OS (see Japanese Patent Laid-Open No. 2004-310154, FIG. 2).

When a standard driver is used, the functionality of the standard driver can be enhanced by using an application provided by a printer vendor.

However, when a standard driver is used, the OS might not provide a function of obtaining an icon image or an application provided by a printer vendor might not be allowed to refer to an icon image obtained by the OS. In this case, the application provided by the printer vendor is unable to use the icon image provided by a printer.

SUMMARY

Embodiments of the present disclosure provide a control method implemented by executing an application that is stored in an information processing apparatus and that provides a print setting screen for allowing a user to set print settings used when a driver in the information processing apparatus generates a print command to be provided for printing at a printer, the control method including: receiving an event from an operating system of the information processing apparatus; obtaining, in response to the event being received in the receiving, information about a location where data of an icon indicating the printer is stored, from an external apparatus different from the information processing apparatus via a network; obtaining an icon image on the basis of the obtained information about the location; and causing a display unit of the information processing apparatus to display the obtained icon image.

Further features of the present disclosure will become apparent from the following description of exemplary embodiments with reference to the attached drawings.

BRIEF DESCRIPTION OF THE DRAWINGS

FIG. 2 is a diagram illustrating an example hardware configuration of a client computer and that of a cloud print proxy server in Embodiment 1.

FIG. 7 is a diagram illustrating an example icon saving method in the cloud print service in Embodiment 1.

DESCRIPTION OF THE EMBODIMENTS

Embodiments of the present disclosure will be described below with reference to the drawings.

Embodiment 1

Figure 1:
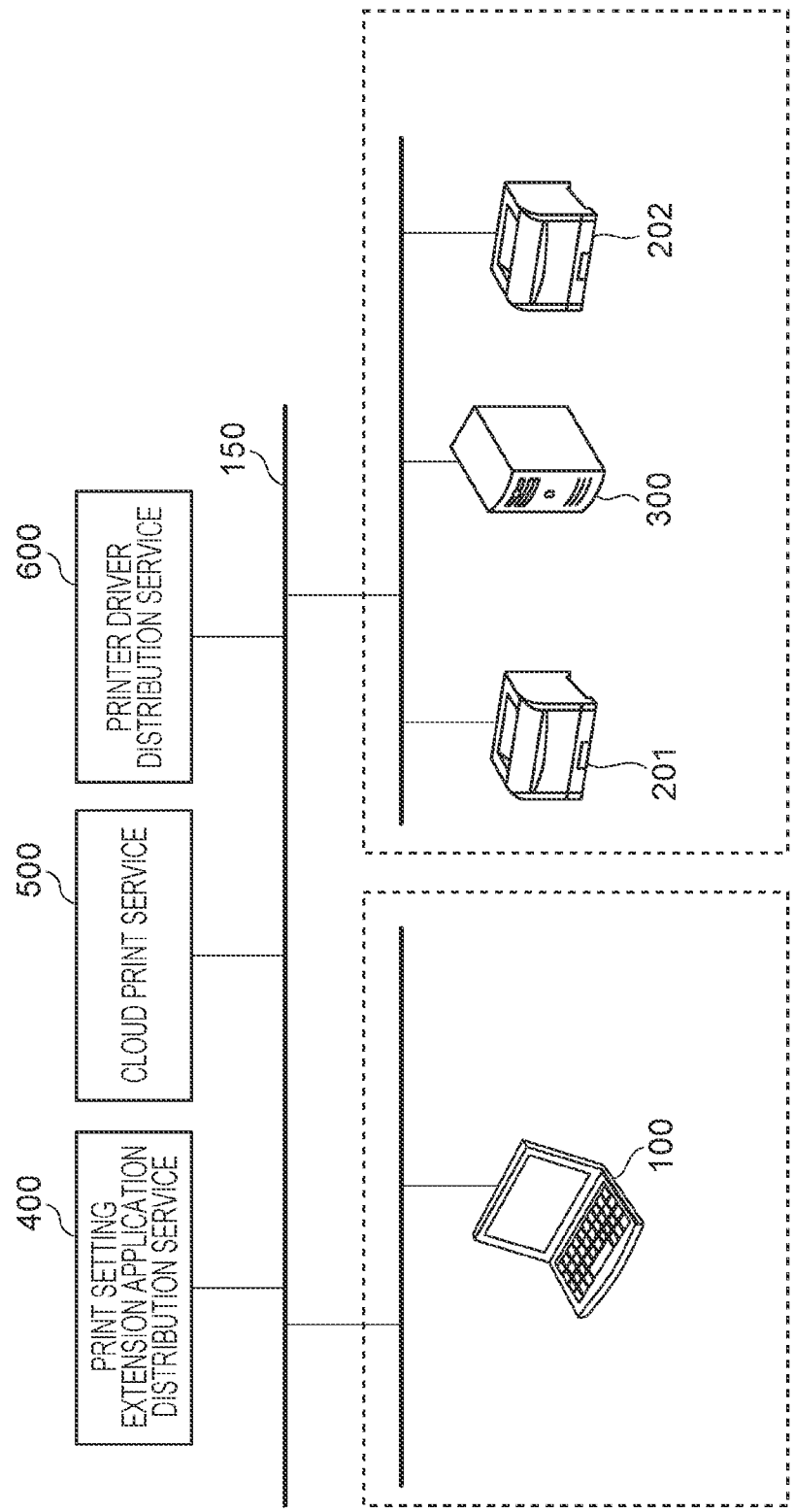
FIG. 1 is a diagram illustrating an example network configuration of Embodiment 1.

FIG. 1 is a schematic network configuration diagram of an environment of a network 150 according to the embodiments of the present disclosure. A client computer 100 is connected to the network 150 so as to be able to communicate. A cloud-print-supporting printer 201, a non-cloud-print-supporting printer 202, and a cloud print proxy server 300 connected to a different intranet are present and are connected through the Internet. A printer driver distribution service 600, a print setting extension application distribution service 400, and a cloud print service 500 are connected to the network 150.

The printer driver distribution service 600 performs a Web-based service of distributing printer drivers to the client computer 100. The client computer 100 searches for with a specific protocol and finds a printer, obtains identification information of the printer, and obtains from the printer driver distribution service 600 and installs a printer driver corresponding to the identification information. The specific protocol is, for example, WSD (Web Services for Devices) or IPP (Internet Printing Protocol). The client computer 100 also performs a process of updating the printer driver.

For example, there may be a case where a printer driver of a version later than the version of the printer driver installed in the client computer 100 has been uploaded to the printer driver distribution service 600. At this time, the client computer 100 obtains the new printer driver from the printer driver distribution service 600. The client computer 100 updates the installed printer driver.

The print setting extension application distribution service 400 is a server that performs a service of distributing applications to be executed in the client computer 100. When accepting a user operation for requesting installation of a print setting extension application, the client computer 100 obtains from the print setting extension application distribution service 400 and installs an applicable print setting extension application. When an information file (hereinafter referred to as "Inf file") of the printer driver includes the identifier of an application, the client computer 100 obtains from the print setting extension application distribution service 400 and installs an applicable print setting extension application.

The cloud print service 500 is an Internet print control service built on a cloud, which is a server system constituted by a plurality of servers (that is, a server system). In this embodiment, the cloud print service 500 can be connected to each intranet and can be directly connected to the client computer 100 and the cloud-print-supporting printer 201 through the Internet. In contrast, the cloud print service 500 can be connected to the non-cloud-print-supporting printer 202 via the cloud print proxy server 300 described below.

The cloud print service 500 manages an account by using a user ID and a password, and a user can access the cloud print service 500 by using this account. In this embodiment, the cloud print service 500 functions as a print server system.

The cloud print proxy server 300 is a computer that has a hardware configuration similar to that of the client computer 100 and in which a cloud print proxy 1054 is installed. The non-cloud-print-supporting printer 202 can be connected to the cloud print service 500 via the cloud print proxy server 300. Accordingly, even a printer not supporting cloud print can be registered in the cloud print service 500 and can perform output.

FIG. 2 is a hardware configuration diagram illustrating an internal configuration of the client computer 100 and that of the cloud print proxy server 300.

In FIG. 2, the client computer 100 includes a CPU 101 that controls the entire computer in accordance with a program stored in a ROM 1021 or a RAM 1022 of a main storage device 102 or in an auxiliary storage device 105.

The RAM 1022 is also used as a work area when the CPU 101 performs various processes. The auxiliary storage device 105 stores an operating system (OS) 1053 that includes a cloud printer driver 1057, an application 1051, a print setting extension application 1052, a device management system 1055, a printer driver 1056, and so on. In the following description, the main storage device 102 and the auxiliary storage device 105 are collectively referred to as a storage device.

Input devices including a pointing device 109, such as a mouse or a touch panel, and a keyboard 108 are devices connected through an input I/F 103 and used for a user to give the computer various instructions.

An output I/F 104 is an interface for externally outputting data and outputs data to output devices, such as a monitor 110 and a panel 111.

A connection to a printer 200 (in the embodiments of the present disclosure, printers are collectively referred to as "printer 200" regardless of whether the printers support cloud print) and to each system is made through the network 150 via a communication I/F 106. A system bus 107 is a common data system bus for exchanging data between I/Fs and modules. In addition, the CPU 101 performs processes on the basis of the program stored in the storage device to thereby implement processes of the present disclosure.

This embodiment assumes two drivers, namely, the cloud printer driver 1057 and an IPP standard driver, to be standard drivers included in the operating system 1053.

The cloud printer driver 1057 is a printer control program that can instruct any model of printer, if connected to the cloud print service 500, to perform printing. The IPP standard driver is a printer control program that can instruct any model of printer, if connected with the IPP protocol, to perform printing.

The application 1051 refers to a general business application, is a general application that allows editing of a document, creation of a presentation document, or the like, and is assumed to be an application that can give a print instruction in response to an operation on a UI, such as a menu.

The print setting extension application 1052 is an application that operates in cooperation with a standard printer driver, such as the cloud printer driver 1057, included in the operating system 1053. The print setting extension application 1052 provides a function of setting detailed print settings specific to a print target printer. The print setting extension application 1052 may store a group of icons of respective supported printers. An icon of a printer (that is, a printer icon) is, for example, created for each model of the printer. An icon of a printer can be regarded as visual information (a graphic or a picture) representing the printer.

The device management system 1055 is a program downloaded from the printer driver distribution service 600 similarly to the printer driver 1056 described below for managing various types of information regarding the non-cloud-print-supporting printer 202, which is an output target. The device management system 1055 retains an icon corresponding to the output target printer as information other than the above-described information.

The printer driver 1056 is a model-specific printer control program provided by a printer vendor and is assumed to be acquired from the printer driver distribution service 600. It is assumed that the printer driver 1056 can set device-specific detailed print settings by itself.

Regarding the cloud print proxy server 300, only an application stored in the auxiliary storage device 105 is different. More specifically, the cloud print proxy 1054 is stored instead of the print setting extension application 1052. The cloud print proxy 1054 is a program for converting various communication procedures in order to provide a cloud print service to the non-cloud-print-supporting printer 202.

Regarding the cloud print proxy server 300, functional modules other than the above-described module are similar to those of the client computer 100, and therefore, a description thereof will be omitted.

The cloud print proxy server 300 may be integrated with the client computer 100. In this case, in the auxiliary storage device 105, all of the print setting extension application 1052, the cloud printer driver 1057, the cloud print proxy 1054, the device management system 1055, and the printer driver 1056 are stored.

Figure 3:
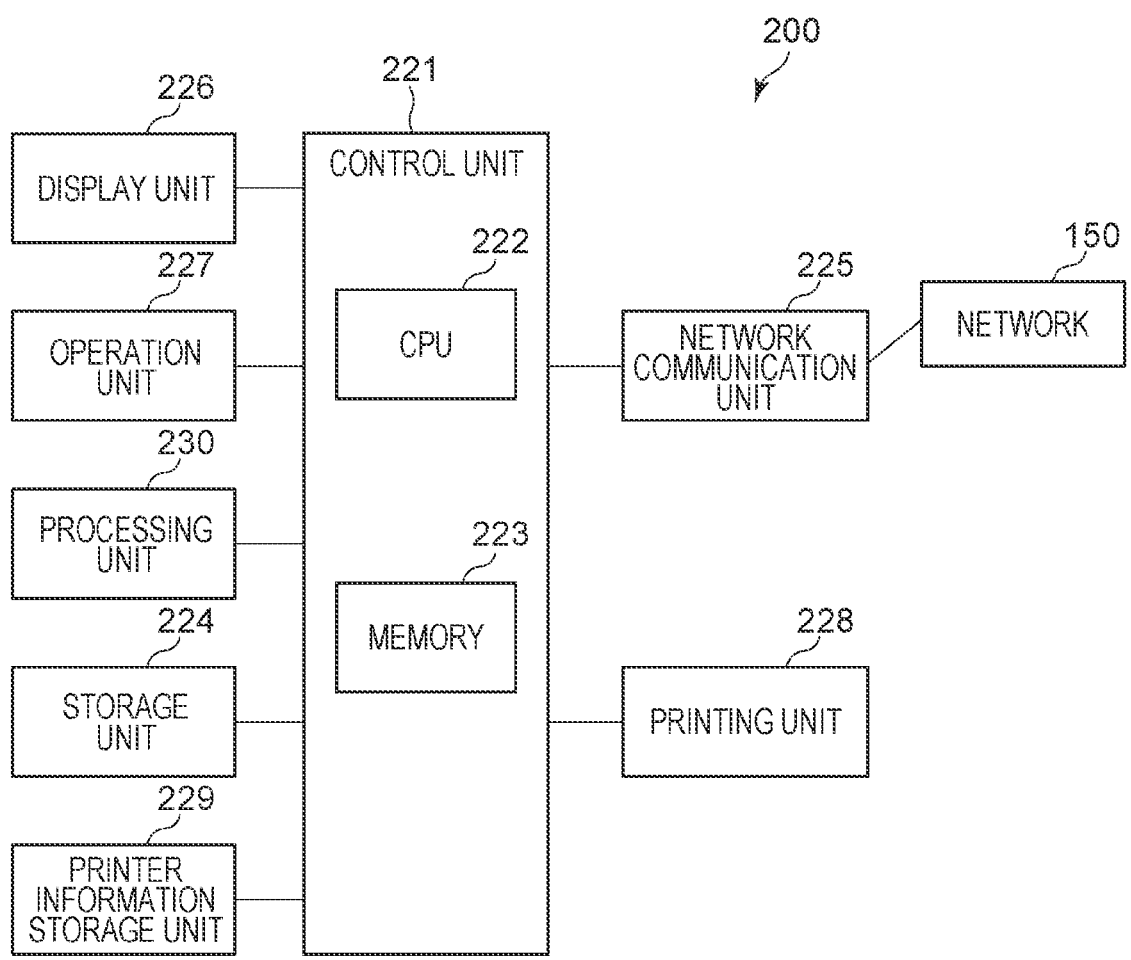
FIG. 3 is a diagram illustrating example functional blocks of a printer in Embodiment 1.

FIG. 3 is a diagram illustrating functional blocks of the printer 200, which is an example of an image processing apparatus in the embodiments of the present disclosure. The cloud-print-supporting printer 201 and the non-cloud-print-supporting printer 202 have a configuration similar to the configuration of the printer 200.

A control unit 221 that includes a CPU (central processing unit) 222 controls the entire operation of the printer 200. The CPU 222 reads control programs stored in a memory 223 or a storage unit 224 and performs various types of control including print control and read control. The memory 223 is used as a work area or a temporary storage area for loading various control programs. The storage unit 224 stores print data, image data, various programs, and various types of setting information. Although this embodiment assumes an auxiliary storage device, such as an HDD (hard disk drive), to be the storage unit 224, a nonvolatile memory, such as an SSD (solid state drive), may be used instead of the HDD. Accordingly, hardware including the CPU 222, the memory 223, and the storage unit 224 constitutes a computer.

A processing unit 230 has a RIP (raster image processor) function of expanding print data received via a network and generating a print image. The processing unit 230 also has capabilities of an image processing unit and can perform resolution conversion and a correction process for an image. Although this embodiment assumes that the image processing unit is implemented as a hardware circuit (such as an ASIC or an FPGA), this embodiment is not limited to this. For example, the printer 200 may include a processor for image processing, and the processor for image processing may execute an image processing program to thereby implement image processing and the expansion process for print data. Furthermore, the CPU 222 may execute the image processing program to thereby perform image processing and the expansion process for print data. Image processing may be performed by a combination of any of the above-described configurations.

An operation unit 227 includes a liquid crystal display unit having a touch panel function and various hardware keys, functions as a display unit 226 that displays information, functions as an accepting unit that accepts user instructions, and functions as a reading unit to read a document and generate a read image. The generated read image is stored in the storage unit 224. A print image generated by the processing unit 230 analyzing print data is transferred to a printing unit 228 from the control unit 221, and the printing unit 228 receives a control command and the print image via the control unit 221 and prints an image on a sheet fed from a paper cassette (not illustrated), on the basis of the print image.

The control unit 221 is connected to the network 150 via a network communication unit 225. The network communication unit 225 transmits an image and information to a communication apparatus on the network 150 and receives print data and information from a communication apparatus on the network 150.

A printer information storage unit 229 stores a hardware ID (hereinafter referred to as "HWID"), which is an identifier for uniquely identifying the printer 200, capability information, and an icon. The printer information storage unit 229 may be included in the storage unit 224.

Figure 4:
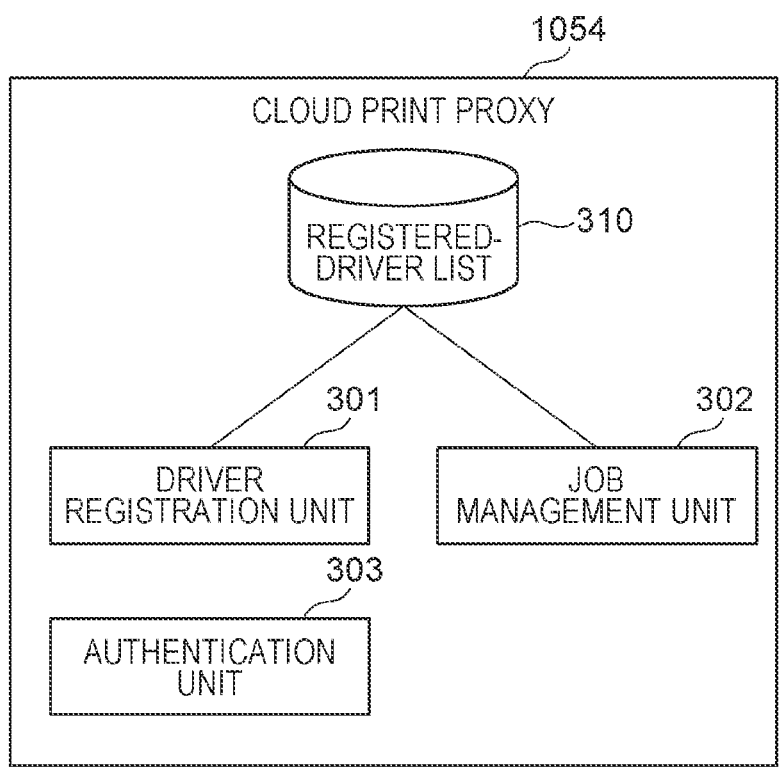
FIG. 4 is a diagram illustrating example functional blocks of a cloud print proxy in Embodiment 1.

FIG. 4 is a functional block diagram of the cloud print proxy 1054 according to the embodiments of the present disclosure.

The cloud print proxy 1054 is an application that has a conversion function for making the non-cloud-print-supporting printer 202 be usable in the cloud print service 500. In this embodiment, the cloud print proxy 1054 has functions of a driver registration unit 301, a job management unit 302, an authentication unit 303, and a registered-driver list 310. The driver registration unit 301 lists the printer drivers 1056 registered in advance in the cloud print proxy server 300 and accepts user selection. The driver registration unit 301 registers the selected printer driver 1056 in the cloud print service 500 and, when registration is successful, registers the printer driver 1056 on the registered-driver list 310.

The job management unit 302 receives a print job from the cloud print service 500 and transmits the print job directly to the cloud-print-supporting printer 201 depending on the situation.

The authentication unit 303 manages credential information including a user ID and a password for the cloud print service 500 used by a user. The cloud print service 500 that is an authentication counterpart may have this function.

Figure 5:
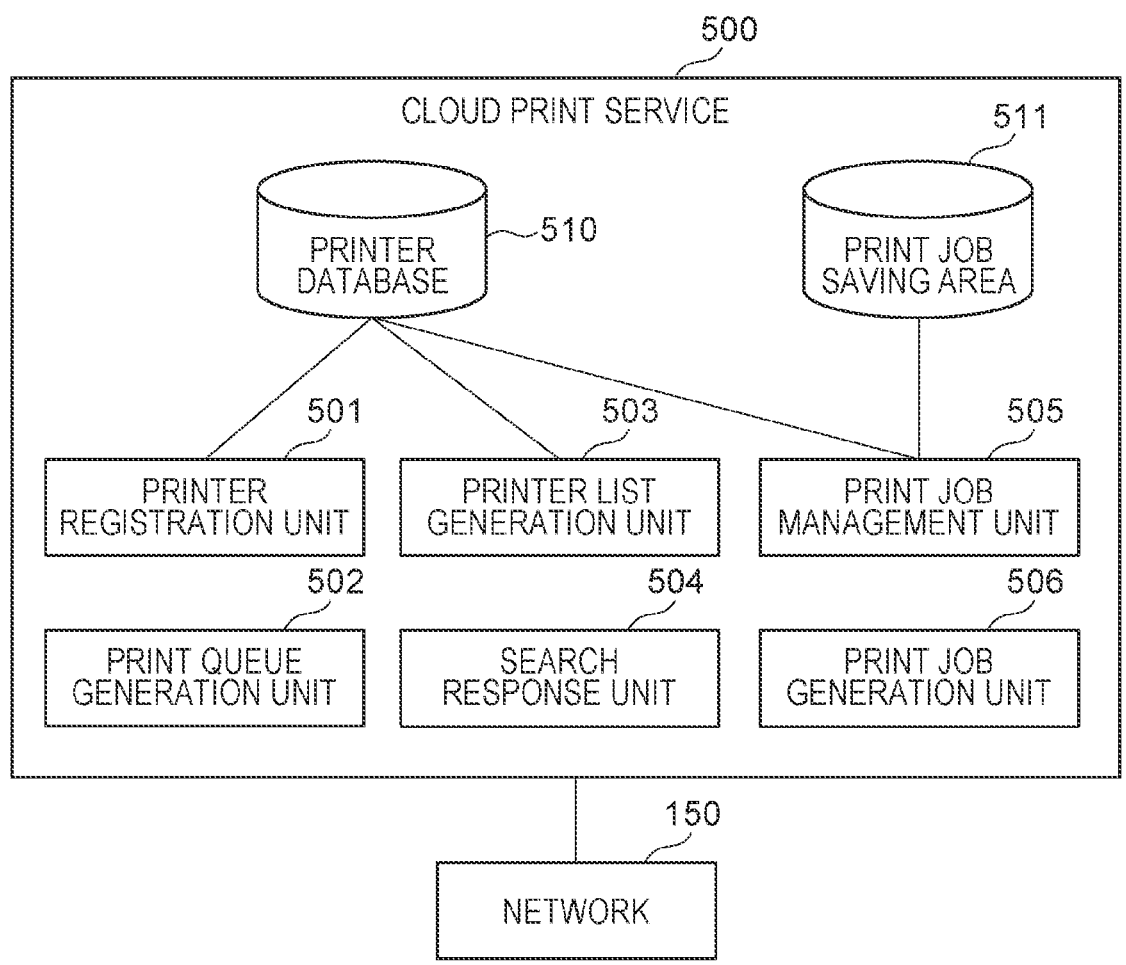
FIG. 5 is a diagram illustrating example functional blocks in a cloud print service in Embodiment 1.

FIG. 5 is a functional block diagram of the cloud print service 500 according to the embodiments of the present disclosure.

The cloud print service 500 is a cloud service provided through the Internet and can provide print-related functions. In this embodiment, the cloud print service 500 has functions of a printer registration unit 501, a print queue generation unit 502, a printer list generation unit 503, a search response unit 504, and a printer database 510. The cloud print service 500 further has functions of a print job management unit 505, a print job generation unit 506, and a print job saving area 511. Another cloud print service 500 that cooperates with the cloud print service 500 may have these functions.

When a printer registration instruction is given from the cloud-print-supporting printer 201, the printer registration unit 501 uses the print queue generation unit 502 to generate a print queue and registers the generated print queue in the printer database 510 while linking the print queue with printer identification information. The printer database 510 stores an icon of the printer. For the non-cloud-print-supporting printer 202, a registration operation needs to be performed by using the cloud print proxy server 300 described above. The print queue of the printer and the printer identification information being linked with each other and registered is referred to as the printer being registered. To the registered printer, various attributes may be added. Examples of the attributes include the location of the printer.

The printer list generation unit 503 generates a list of registered printers.

The search response unit 504 returns, in response to a printer search event from the client computer 100 to the cloud print service 500, information about registered printers.

The print job management unit 505 receives a print job from the client computer 100 and transmits the print job directly to the printer 200 depending on the situation. Alternatively, the print job management unit 505 temporarily saves the print job in the print job saving area 511, passes, at the timing when an output destination printer is chosen, the print job to the print job generation unit 506 in which the print job is converted to an appropriate form, and transmits the print job.

Figure 6:
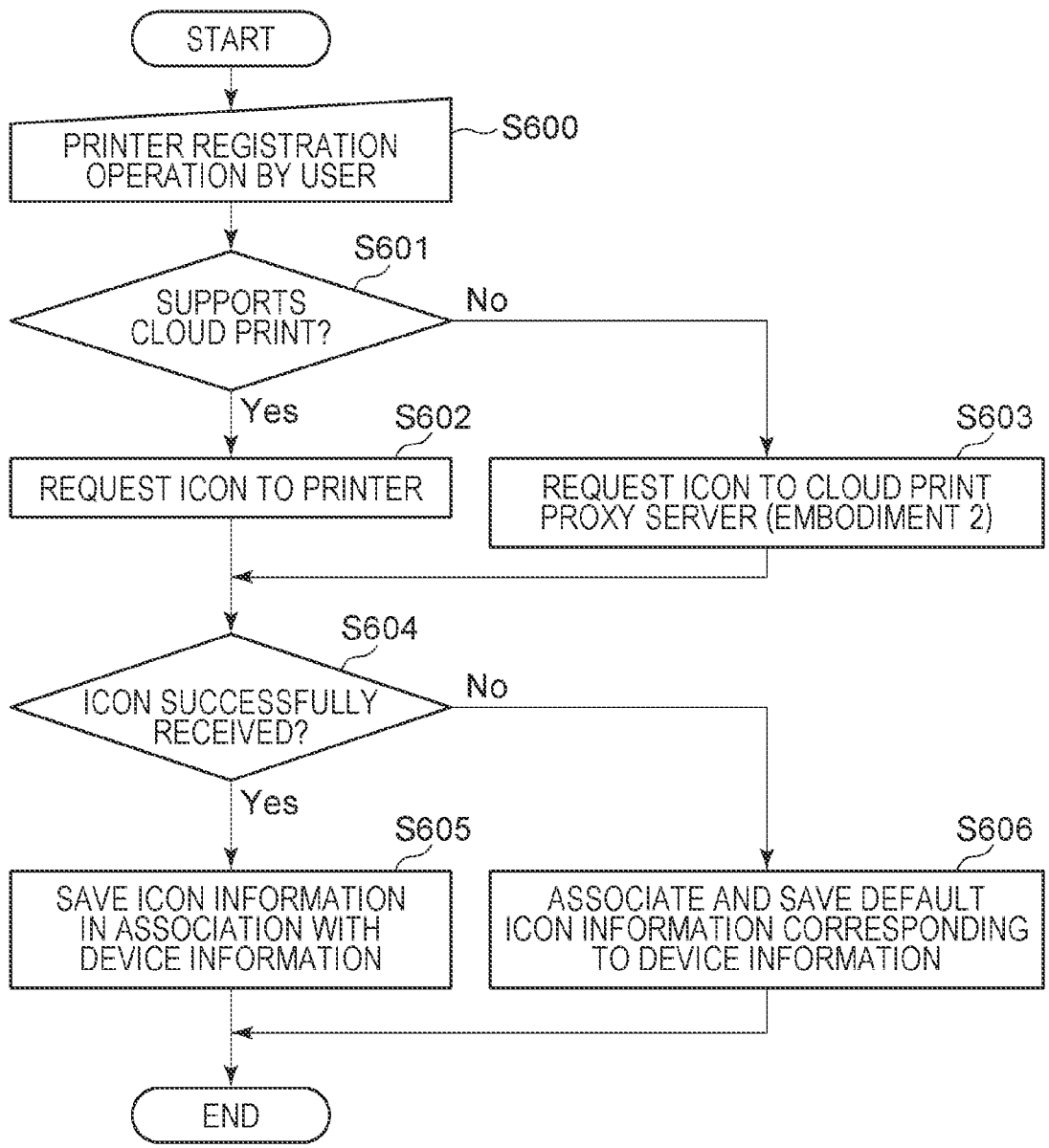
FIG. 6 is a flowchart illustrating an example icon obtaining process performed by the cloud print service upon registration of the printer in the cloud print service in Embodiment 1.

FIG. 6 is a flowchart of an icon obtaining process performed by the cloud print service 500 upon registration of a printer in the cloud print service 500 according to the embodiments of the present disclosure. Therefore, operations in this flowchart are performed by the cloud print service 500 unless otherwise stated. It is assumed that the printer has information about an icon that can be obtained in the flowchart.

This flow starts with a user selecting a printer and registering the printer in the cloud print service 500 (S600). When the printer to be registered is the cloud-print-supporting printer 201, an operation can be performed through a Web UI (not illustrated in this embodiment) provided by the cloud-print-supporting printer 201. The cloud print service 500 accepts a device registration operation performed by the user (S600), and the cloud print service 500 determines in step S601 whether the printer to be registered is a printer supporting cloud print. If it is determined that the printer to be registered is the cloud-print-supporting printer 201, the flow proceeds to S602. In step S602, the cloud print service 500 sends an icon obtaining request to the cloud-print-supporting printer 201, which is a registration target in S600 described above.

On the other hand, if it is determined in step S601 described above that the printer to be registered is not directly connected to the cloud print service 500, the flow proceeds to step S603, which will be described in Embodiment 2 (although the description will be given in the separate embodiment to facilitate understanding, these steps S602 and S603 can be performed in the same product, and therefore, are in the same embodiment). If it is determined in step S604 that an icon requested in S602 or S603 described above is successfully received, the flow proceeds to S605. In step S605, the cloud print service 500 saves the received icon in the printer database 510 while linking the icon with identification information of the printer. For example, as illustrated in FIG. 7, a HWID or the like and an icon are linked with each other for each printer and saved. On the other hand, if it is determined in S604 described above that an icon is not successfully received, the cloud print service 500 uses identification information of the printer and saves an appropriate default icon corresponding to the model in the printer database 510 while linking the icon with the identification information (S606).

[Another Method A in Embodiment 1] In step S602, a method as described below may be employed instead of the method of simply making an icon obtaining request. The cloud-print-supporting printer 201 transmits in advance a request for URL information indicating the icon storage location to the cloud print service 500. Specifically, the cloud-print-supporting printer 201 transmits a request for obtaining information of the attribute printer-static-resource-directory-uri by using the IPP operation Get-Printer-Attributes. In step S602, the cloud print service 500 makes a response to the request. Specifically, the cloud print service 500 makes this response by transmitting URL information indicating the icon storage location to the cloud-print-supporting printer 201. More specifically, the cloud print service 500 sets URL information in the attribute printer-static-resource-directory-uri upon responding to the IPP operation Get-Printer-Attributes. Accordingly, the cloud print service 500 transmits the attribute in which the URL information is set. The cloud-print-supporting printer 201 transmits an icon to the location indicated by the URL information, and the icon is to be saved in the storage location described above. Specifically, the cloud-print-supporting printer 201 transmits an icon to the location indicated by the URL by using the PUT method of HTTP. In S604, it is checked whether an icon is saved in the storage location described above instead of checking whether an icon is successfully received. When an icon is saved in the storage location described above, the URL information and device information (identification information of the printer) are linked with each other and saved in S605. In the other method A, it is checked in S604 whether an icon is saved in the storage location described above instead of checking whether an icon is successfully received. When an icon is saved in the storage location described above, the URL information and device information (identification information of the printer) are linked with each other and saved in S605.

[Yet Another Method B] The embodiment described with reference to FIG. 6 is a configuration in which the cloud-print-supporting printer 201 transmits icon data to the cloud print service 500. However, a configuration may be employed in which the cloud-print-supporting printer 201 communicates information about a location where icon data is stored (URL information) instead of the cloud-print-supporting printer 201 transmitting the icon data itself. This configuration assumes that a server on which the icon data is stored in advance is present on a cloud and the cloud-print-supporting printer 201 retains URL information of the server. In this case, an icon is obtained in S602 with the following procedure. The cloud-print-supporting printer 201 transmits URL information indicating the icon storage location to the cloud print service 500. Specifically, the cloud-print-supporting printer 201 sets the URL information in the attribute printer-static-resource-directory-uri in the IPP operation Set-Printer-Attributes. The cloud-print-supporting printer 201 transmits the attribute in which the URL information is set to thereby transmit the URL information. Here, printer-static-resource-directory-uri is the name of an IPP attribute in which a URI indicating a location where static information, such as icon information, of a printer is stored can be included. When an icon is not stored in advance at the location indicated by the URL, the cloud-print-supporting printer 201 may transmit icon information to the icon storage location by using the PUT operation in HTTP (Hypertext Transfer Protocol).

If it is determined in S604 that URL information is successfully obtained, the cloud print service 500 saves the URL information indicating the icon storage location in association with device information in S605.

Figure 8:
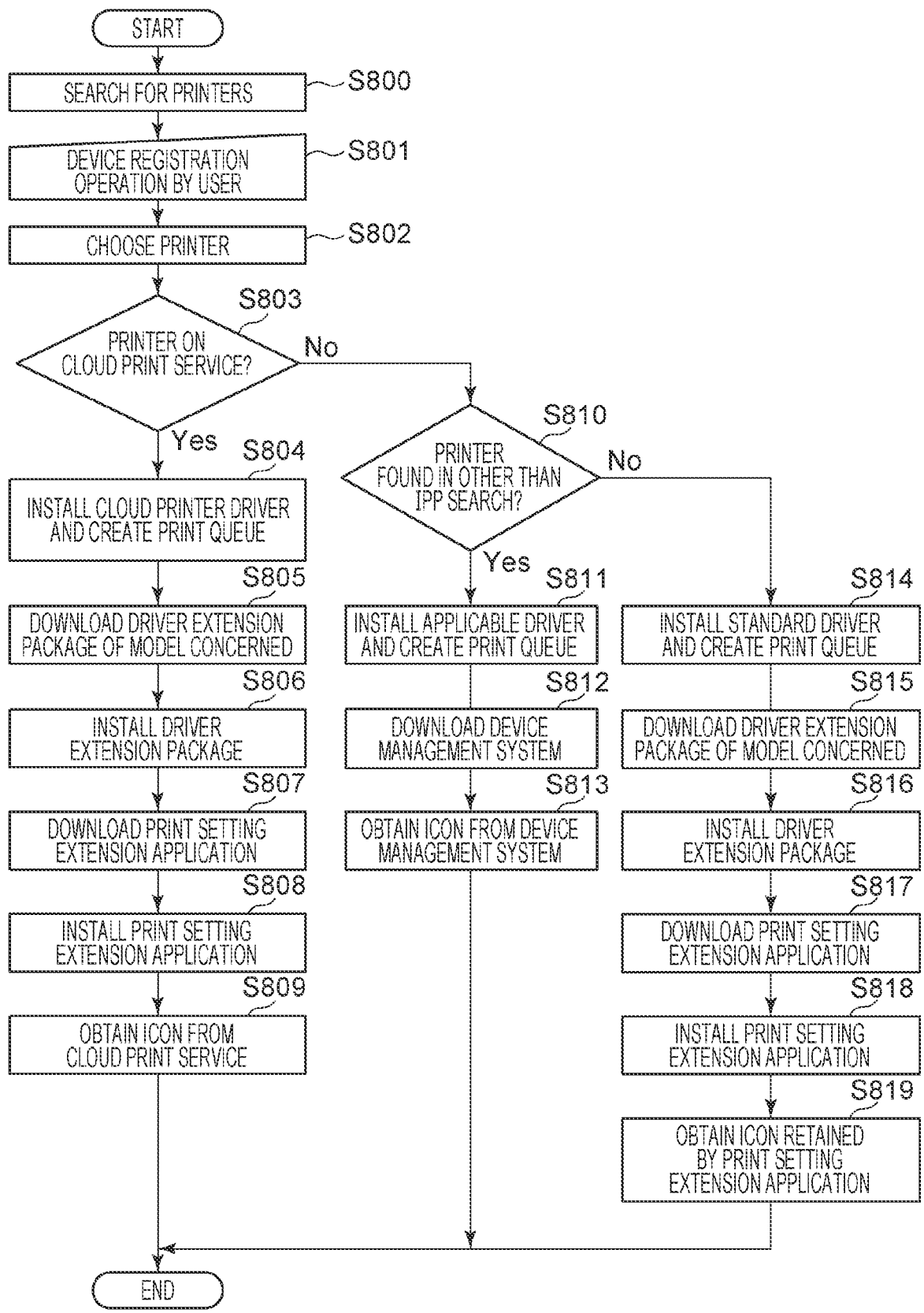
FIG. 8 is a flowchart illustrating an example icon obtaining process performed in the client computer upon registration of the printer in Embodiment 1.

FIG. 8 is a flowchart of a process in which the operating system 1053 running on the client computer 100 obtains an icon in a process for registering a printer. Each step is performed by the operating system 1053. This flowchart starts with a process started in response to a print operation performed by a user from the application 1051, in which the operating system 1053 searches for printers. In S800, the operating system 1053 makes a search by using a protocol such as WSD (Web Services for Devices) or IPP (Internet Printing Protocol) and lists (the names of) found printers. In step S800, a printer that is registered in the cloud print service 500 and to which the user is permitted to output is also detected. That is, the cloud-print-supporting printer 201 and the non-cloud-print-supporting printer 202 that are not on the same intranet can be found in a printer search as long as the printers are registered in the cloud print service 500. The operating system 1053 saves detection flag information indicating whether the group of detected printers is detected in a WSD search or an IPP search and whether each printer is a printer on the cloud print service 500.

Next, in S801, the operating system 1053 accepts an operation of registering (the name of) a printer selected by the user from among the printers listed in S800 described above (selection operation). In S802, the operating system 1053 chooses the printer for which selection is accepted in S801 described above. In S803, the operating system 1053 determines whether the printer selected in S801 described above is indicated as a printer on the cloud print service 500 in the detection flag information saved for the printer. If the selected printer is a printer on the cloud print service 500, the flow proceeds to S804. In step S804, the operating system 1053 identifies the cloud printer driver 1057 as a driver to be installed, on the basis of the detection flag information saved in S800. The operating system 1053 installs the identified cloud printer driver 1057, creates a print queue (printer queue), and links the installed driver with the print queue.

Next, in S805, the operating system 1053 downloads a driver extension package on the basis of a HWID, which is information for identifying the printer, from the printer driver distribution service 600.

The driver extension package is an example of a package distributed from the printer driver distribution service 600. The driver extension package is an information file that can be distributed from the printer driver distribution service 600 and includes the HWID for identifying the printer and identifier information of the print setting extension application 1052. The driver extension package further includes information indicating that the package is a driver extension package and information about the version of the driver extension package and so on.

In S806, the operating system 1053 installs the driver extension package downloaded in S805 described above. The operating system 1053 links the installed driver extension package with the print queue.

Next, in S807, the operating system 1053 searches the print setting extension application distribution service 400 for the print setting extension application 1052 on the basis of the identifier information of the print setting extension application 1052 included in the driver extension package. That is, the operating system 1053 searches for the print setting extension application 1052 having identifier information that is the same as the identification information included in the driver extension package. The operating system 1053 downloads the print setting extension application 1052 found in the search.

In this embodiment, in the print setting extension application distribution service 400, the identifier information of the print setting extension application 1052 in the driver extension package and the print setting extension application 1052 are linked with each other on a one-to-one basis. That is, when a search is made with the identifier information included in the driver extension package, two or more print setting extension applications are not found but only one print setting extension application is always found. In the print setting extension application distribution service 400, information (hereinafter referred to as metadata) for linking identifier information of the print setting extension application 1052 and a HWID included in printer information with each other may be saved. In this case, the print setting extension application 1052 that is appropriate is downloaded by using the metadata.

In S808, the operating system 1053 installs the print setting extension application 1052 downloaded in S807 described above.

After installation of the print setting extension application 1052, the print setting extension application 1052 is linked with the print queue of the printer selected in S801 described above by the operating system 1053 on a one-to-one basis. The print queue retains model information of the printer and print setting information, and therefore, the print setting extension application 1052 can obtain the information and build and present an appropriate print setting UI corresponding to the obtained information. The print setting extension application 1052 may directly communicate with the cloud print service 500, obtain model information of the target and print setting information, and build and provide a UI by using the information. In any case, the user becomes able to change detailed print settings after installation of the print setting extension application 1052. Example printing using the print setting extension application 1052 will be described below.

When the user performs printing by using a standard driver (the cloud printer driver 1057 or the IPP standard driver), a print instruction is given from the application 1051 of the client computer 100. In a specific example, "print" is selected from a file menu of the application 1051.

Figure 9:
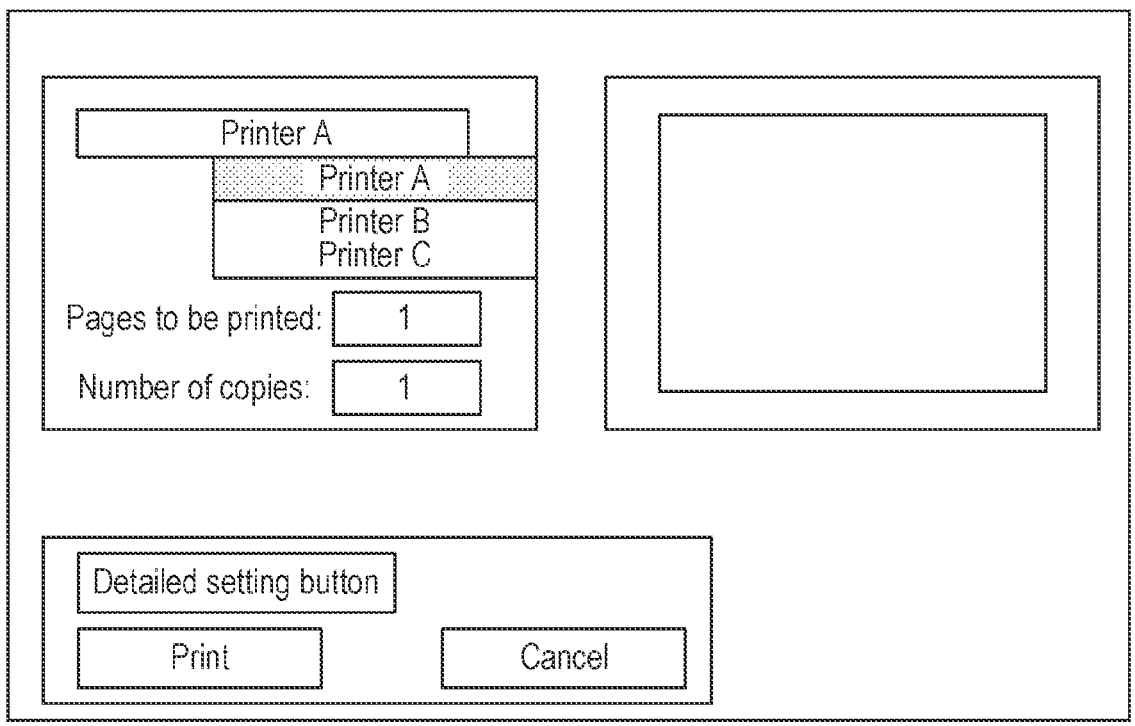
FIG. 9 is a diagram illustrating an example screen of a print common dialog in Embodiment 1.
Figure 10:
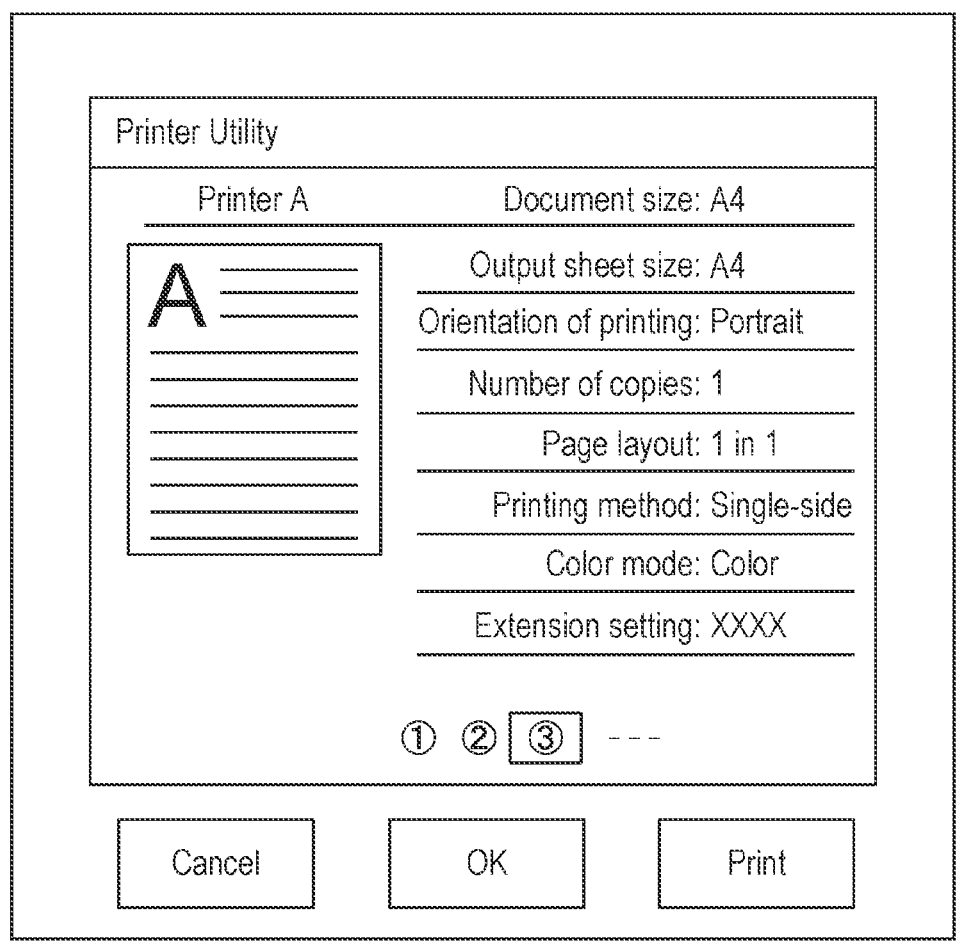
FIG. 10 is a diagram illustrating an example screen for detailed settings in Embodiment 1.

When accepting a print instruction from the user, the application 1051 instructs the operating system 1053 to display a print common dialog (a print setting screen provided by the operating system 1053) illustrated in FIG. 9, as a usual operation of the application 1051. The operating system 1053 displays the print common dialog when instructed by the application 1051. On the print common dialog displayed by the operating system 1053, printers installed for the client computer 100 can be listed, pages to be printed can be specified, and the number of copies can be set. The user can select on the print common dialog, the print queue of a printer to which the user wants to output, select a detailed setting button (object) displayed on the same screen, and give the print queue a print setting change instruction. At this time, the print setting extension application 1052 linked with the print queue is started by the operating system 1053, and a print setting change UI illustrated in FIG. 10 is displayed. For example, image processing related to darkness, tones, and so on, whether stamp combining is allowed, a punching position, a stapling position, and so on can be set. In response to the user changing print settings and giving a print instruction on the print setting UI, the operating system 1053 that accepts the instruction communicates the details of the print settings to a driver linked with the print queue. The driver transmits data to be printed to the printer or the cloud print service 500. That is, when the driver is the IPP standard driver, the driver transmits the data to be printed to the printer, and when the driver is the cloud printer driver 1057, the driver transmits the data to be printed to the cloud print service 500.

In S809, the operating system 1053 sends an icon request to the cloud print service 500 on the basis of a HWID or the like for identifying the printer.

The cloud print service 500 that receives the icon request transmits an icon that corresponds to the received HWID among icons saved as illustrated in FIG. 7 to the requestor. The operating system 1053 links the received icon with the print queue. The icon linked with the print queue is displayed on a printer management screen that is displayed by the operating system 1053 as an icon representing the print queue.

Although the operating system 1053 sends an icon obtaining request to the cloud print service 500 in this flow, the print setting extension application 1052 may send an icon obtaining request. In this case, the print setting extension application 1052 provides an obtained icon to the operating system 1053. When the print setting extension application 1052 sends an obtaining request to the cloud print service 500, the print setting extension application 1052 may send an obtaining request as requested by the operating system 1053.

In this embodiment, the cloud print service 500 obtains in advance an icon from printer, and the operating system 1053 or the print setting extension application 1052 subsequently sends an icon obtaining request to the cloud print service 500. However, in response to the operating system 1053 or the print setting extension application 1052 transmitting an icon obtaining request to the cloud print service 500, the cloud print service 500 that receives the request may obtain an icon from the printer at the time of reception. A form may be employed in which before installed, the print setting extension application 1052 includes in advance icons corresponding to respective models of printers that the application supports. In this case, an icon may be obtained from an area in which the icons are included without obtaining an icon from the printer or the cloud print service 500.

[Continuation of Other Method A in Embodiment 1] In S809, an icon request may be made with the following procedure. First, the operating system 1053 sends a request for URL information indicating the icon storage location to the cloud print service 500. Specifically, the operating system 1053 transmits the IPP operation Get-Printer-Attributes to the cloud print service 500. At this time, as an argument of this operation, the operating system 1053 sets the IPP attribute printer-static-resource-directory-uri. Accordingly, a request for a value of printer-static-resource-directory-uri is made. The cloud print service 500 that receives the request returns the value of printer-static-resource-directory-uri to the operating system 1053. This value includes URL information indicating the icon storage location as described above (which may be the URL information previously received from the printer or URL information of a different location when the icon is placed at the location). Therefore, the URL information is transmitted to the operating system 1053. Subsequently, the operating system 1053 transmits an icon request for the obtained URL information. As a result, an icon is transmitted from the storage location described above and the operating system 1053 receives the icon. In the other method B described above, the same operations as in the other method A are performed in this step.

Figure 11:
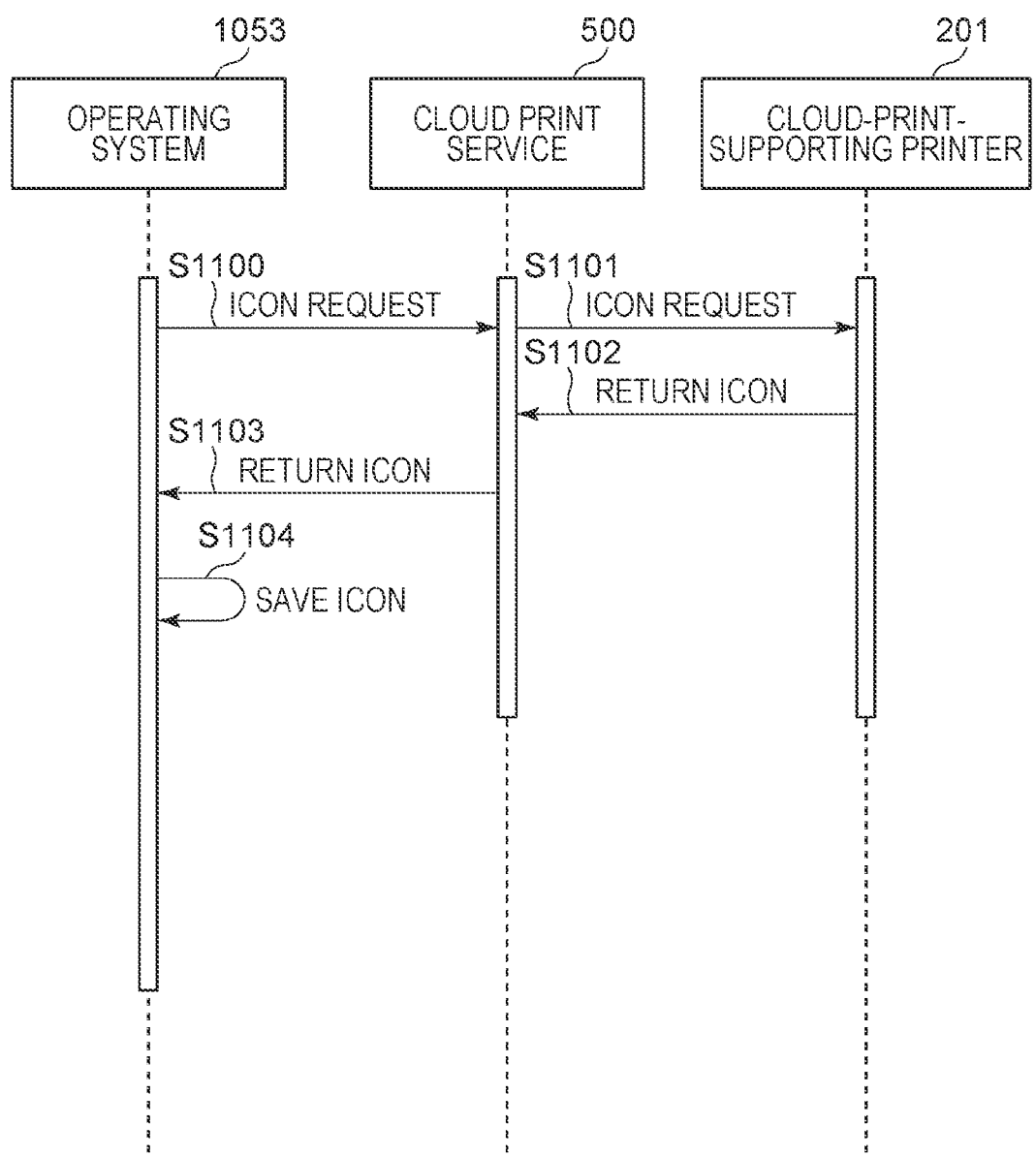
FIG. 11 is a sequence chart illustrating an example sequence of a process in which the cloud print service obtains an icon in response to an icon request from an operating system in Embodiment 1.

FIG. 11 is a sequence chart of a process in which the cloud print service 500 obtains an icon in response to an icon request made by the operating system 1053. This sequence chart illustrates an example of a sequence included in S809 in FIG. 8.

The sequence chart starts with a process (S1100) in which the operating system 1053 sends to the cloud print service 500, an icon request to be directed to the cloud-print-supporting printer 201 linked with the print queue. Instead of making an icon request, the other method using URL information may be employed as described above. In this case, as in the above description, an icon is obtained by using URL information instead of returning an icon in S1103. Subsequently, in step S1101, the cloud print service 500 that receives the icon obtaining request sends an icon obtaining request to the requested cloud-print-supporting printer 201. Instead of making an icon obtaining request, the other method using URL information may be employed as described above. In this case, as in the above description, an icon is obtained by using URL information instead of returning an icon in S1102.

In step S1102, the cloud-print-supporting printer 201 that receives the icon obtaining request transmits an icon saved in the printer information storage unit 229 to the cloud print service 500 that is the requestor. In step S1103, the cloud print service 500 that receives the icon transmitted in S1102 described above transmits the icon to the operating system 1053 that is the icon requestor. Subsequently, in step S1104, the operating system 1053 that receives the icon links the icon with the print queue.

In step S1103, the icon received by the cloud print service 500 may be linked with information about the printer and saved as illustrated in FIG. 7 or may be temporarily saved.

Although a method for obtaining an icon from the cloud print service 500 has been described in this embodiment, the operating system 1053 may choose an appropriate icon from among a group of icons stored in the print setting extension application 1052 on the basis of the HWID and obtain the icon. The icon may be linked with the print queue.

If it is determined in S803 on the basis of the detection flag information created in S800 that the printer selected by the user with the registration operation is not a printer on the cloud print service 500, the flow proceeds to S810. If it is determined in step S810 on the basis of the detection flag information created in S800 that the printer selected by the user in S801 described above is a printer found in other than an IPP search, the flow proceeds to S811. In step S811, the operating system 1053 downloads from the printer driver distribution service 600, an applicable driver in accordance with the HWID on the basis of the detection flag information, installs the driver, and creates a print queue. The applicable driver is identified by using the HWID. In step S812, the operating system 1053 downloads the device management system 1055 corresponding to the printer. In step S813, the operating system 1053 obtains an icon present in the device management system 1055 downloaded in S812 described above and links the icon with the created print queue.

On the other hand, if it is determined in S810 described above on the basis of the detection flag information created in S800 that the printer selected by the user in S801 described above is a printer found in an IPP search, the flow proceeds to S814. In step S814, the IPP standard driver specified in the operating system 1053 interacts with the printer as specified by the standard and generates a print queue that reflects necessary capability information.

That is, the operating system 1053 installs the IPP standard driver having a function of causing a plurality of models of printers from a plurality of printer vendors to perform printing. After installation, a connection with the printer described above is made via the print queue, and therefore, a print instruction can be sent only to the connected printer. In S814, a print queue associated with the installed IPP standard driver is created on the operating system 1053. The process in S815 to S818 is similar to that in S805 to S808 described above, and therefore, a description thereof will be omitted. In S819, the operating system 1053 selects an appropriate icon from among a group of icons in the print setting extension application 1052 installed in S818 described above, on the basis of information, such as the HWID or the like of the printer, and obtains the icon. The operating system 1053 may link the icon obtained at this time with the print queue created in S814.

Figure 12:
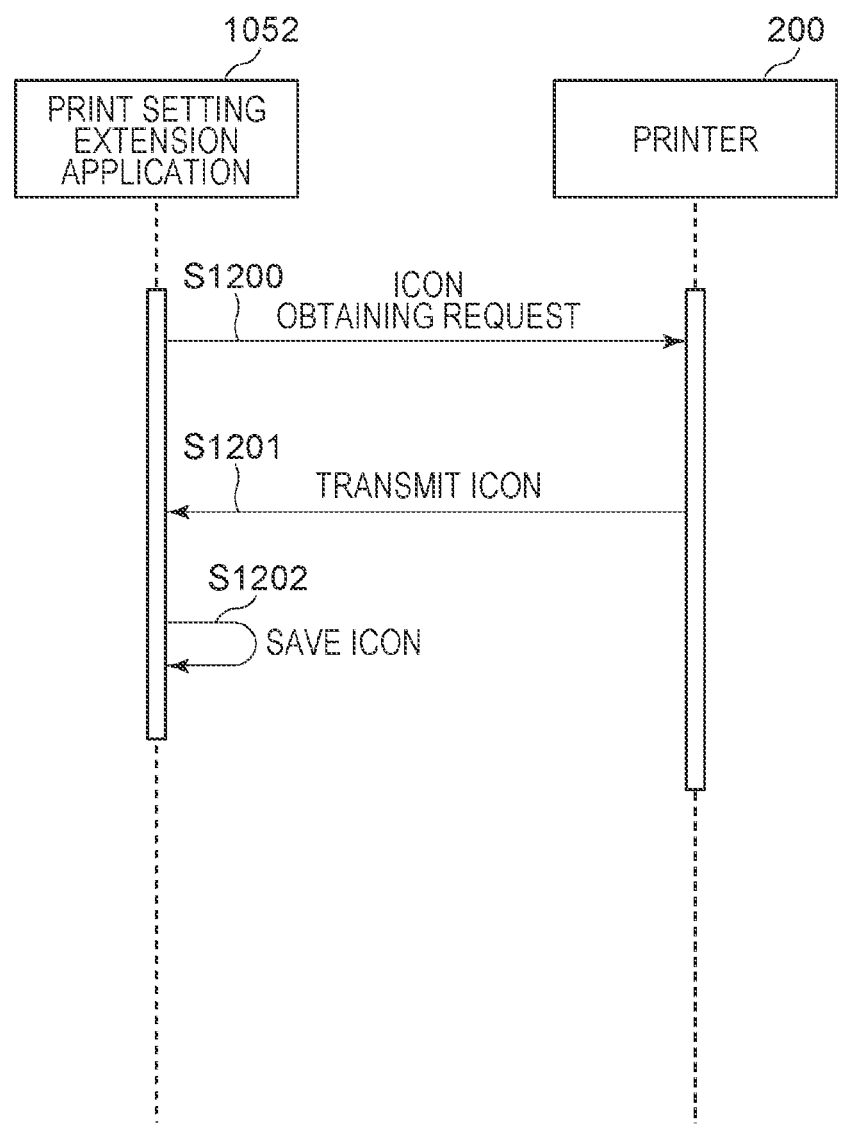
FIG. 12 is a sequence chart illustrating an example sequence of a process in which a print setting extension application obtains an icon from the printer in Embodiment 1.
Figure 16:
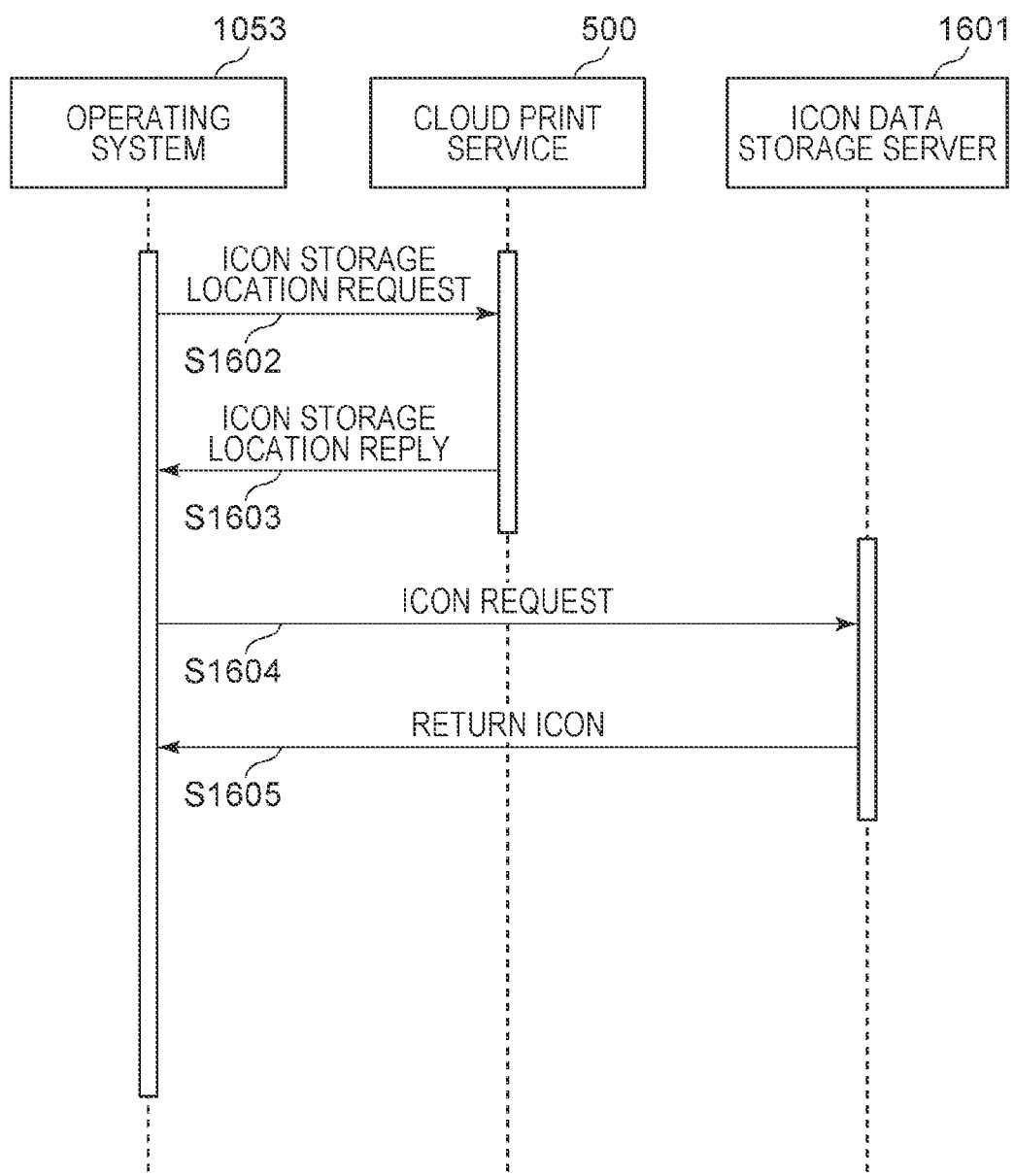
FIG. 16 is a sequence chart illustrating an example sequence of a process in which the operating system makes an icon request and obtains an icon in Embodiment 3.

Instead of S819, the print setting extension application 1052 may obtain an icon from the printer 200 as illustrated in the sequence chart in FIG. 12. Alternatively, the print setting extension application 1052 may obtain an icon that matches the printer chosen in S802 from among a plurality of icons included in advance therein. In S1200, the print setting extension application 1052 sends an icon request to the printer 200. In S1201, the printer 200 returns an icon saved in the printer information storage unit 229 to the requestor. In S1202, the print setting extension application 1052 that receives the returned icon saves the icon. The print setting extension application 1052 may link this icon with the print queue. As illustrated in FIG. 16 described below, the print setting extension application 1052 may obtain from the printer 200, access information (a link) for accessing a server that stores an icon, access the server on the basis of the link, and obtain the icon from the server.

Figure 13:
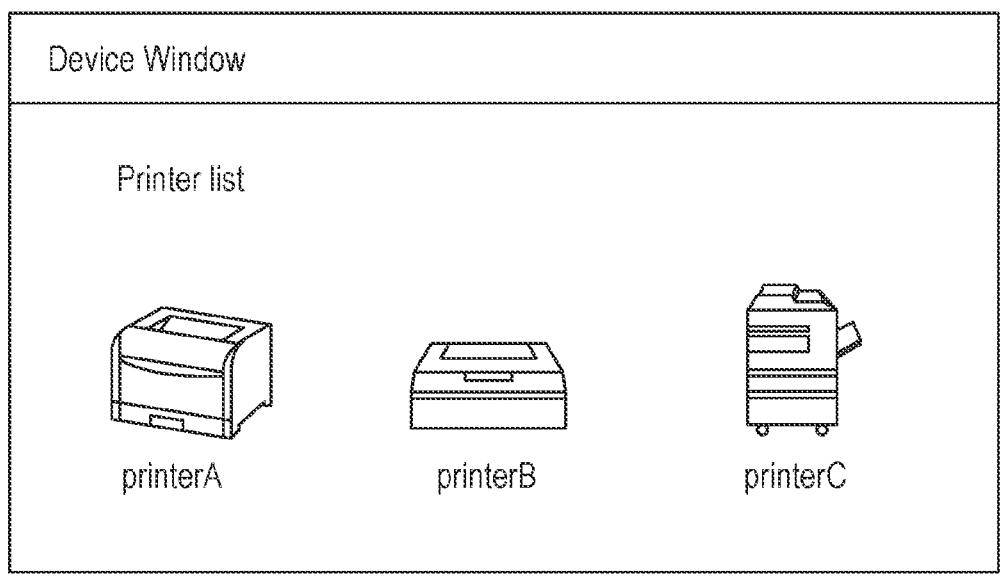
FIG. 13 is a diagram illustrating example display of icons on the client computer in Embodiment 1.

The icon obtained as illustrated in FIG. 8 is displayed by the operating system 1053 on a screen system, of the operating system 1053, displaying a list of peripheral devices (that is, a printer management screen for managing devices, such as printers) as illustrated in FIG. 13. The icon may be displayed on a screen (FIG. 14) that is displayed when the print setting extension application 1052 is started on a screen on which a list of the applications 1051 installed in the client computer 100 is displayed.

With the procedure described above, an icon can also be obtained for a printer on the cloud print service 500. The icon is displayed, for example, on the screen, of the operating system 1053, on which a list of peripheral devices is displayed (FIG. 13) or on the screen of the print setting extension application 1052 (FIG. 14), and therefore, the user can easily identify a printer that the user makes a connection.

Embodiment 2

In Embodiment 1, the cloud print service 500 can obtain an icon from the printer 200 or the cloud-print-supporting printer 201 and the operating system 1053 and the print setting extension application 1052 can obtain and display the icon on the screen. However, the non-cloud-print-supporting printer 202 may be used in the cloud print service 500. At this time, the non-cloud-print-supporting printer 202 is connected to the cloud print service 500 via the cloud print proxy server 300, and therefore, an icon is unable to be obtained with the method of Embodiment 1.

In this embodiment, a method for obtaining an icon from the non-cloud-print-supporting printer 202 when the cloud print service 500 is used will be described with reference to FIG. 6.

The flow starts with step S600 in FIG. 6 in which a registration operation performed by a user for registering the non-cloud-print-supporting printer 202 in the cloud print service 500 by using the cloud print proxy 1054 is accepted. If it is determined in step S601 that the registered printer is not directly connected, the flow proceeds to step S603. In step S603, the cloud print service 500 sends an icon obtaining request to the cloud print proxy server 300. The subsequent flow is similar to that in Embodiment 1, and therefore, a description thereof will be omitted.

Figure 15:
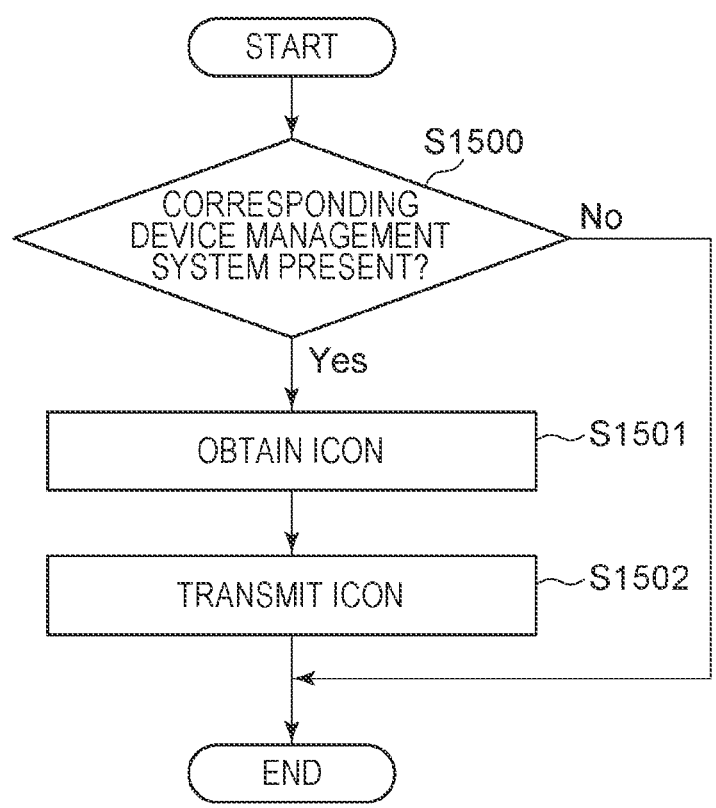
FIG. 15 is a flowchart illustrating an example flow of an icon obtaining process by a cloud print proxy server in Embodiment 2.

FIG. 15 is a flowchart of a process in which the cloud print proxy server 300 that receives the icon obtaining request in step S603 in FIG. 6 obtains and returns an icon of the non-cloud-print-supporting printer 202.

This flow starts with reception of the icon request from the cloud print service 500 and determination as to whether the device management system 1055 has an icon of the requested printer.

Here, the device management system 1055 is assumed to be a system, such as Microsoft Device Stage. More specifically, the device management system 1055 is software providing a system for enhancing the functionality of various peripheral devices and is incorporated in the operating system 1053. The device management system 1055 detects selection of a peripheral device by the user and automatically downloads in advance necessary control software and an application for functionality enhancement, from a server on the Internet. In this embodiment, the server is the printer driver distribution service 600 and the control software is a driver. This embodiment assumes that icons of supported printers are also stored on the server.

If it is determined in step S1500 that the device management system 1055 for the requested printer is present in the cloud print proxy server 300, the flow proceeds to S1501. In step S1501, the cloud print proxy server 300 obtains an icon stored in the main storage device 102 or the auxiliary storage device 105. In step S1502, the cloud print proxy server 300 transmits the icon obtained in S1501 described above to the cloud print service 500 that is the requestor. If it is determined in S1500 described above that the device management system 1055 for the requested printer is not present, the cloud print proxy server 300 transmits a notification of a failure in obtaining an icon to the requestor.

Figure 14:
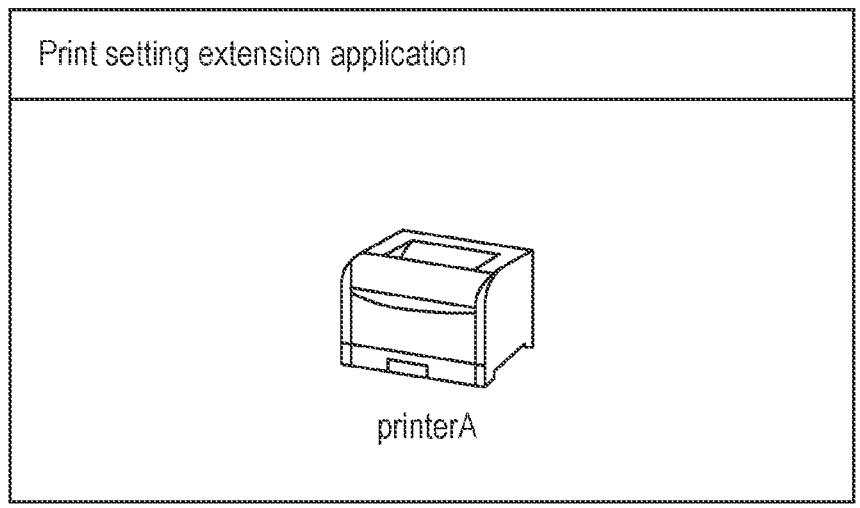
FIG. 14 is a diagram illustrating example display of an icon on the print setting extension application in Embodiment 1.

With the procedure described above, an icon can be obtained also for the non-cloud-print-supporting printer 202 on the cloud print service 500. Accordingly, the user can easily identify a printer that the user makes a connection, with the icon of the printer displayed on, for example, the screen, of the operating system 1053, on which a list of peripheral devices is displayed (FIG. 13) or on the screen of the print setting extension application 1052 (FIG. 14).

Embodiment 3

FIG. 16 is a sequence chart of a process in a case where the cloud print service 500 manages not icon data but a location (URL) where icon data is stored and the operating system 1053 obtains an icon.

The operating system 1053 transmits an icon storage location request S1602 to the cloud print service 500 together with a HWID. The cloud print service 500 obtains from the printer database 510, an icon storage location (URL) corresponding to the transmitted HWID and transmits the icon storage location to the operating system 1053 as an icon storage location reply S1603. The operating system 1053 transmits an icon request S1604 to an icon data storage server 1601 indicated by the icon storage location (URL) communicated in S1603. The icon data storage server 1601 returns icon data to the operating system 1053 in S1605.

Embodiment 4

In Embodiments 1 and 2, a method for obtaining an icon in a flow in which printers are searched for and a driver for a selected printer is subsequently installed as illustrated in FIG. 8 has been described.

In Embodiment 4, a method for obtaining an icon when the print setting extension application 1052 is started will be described.

Figure 17:
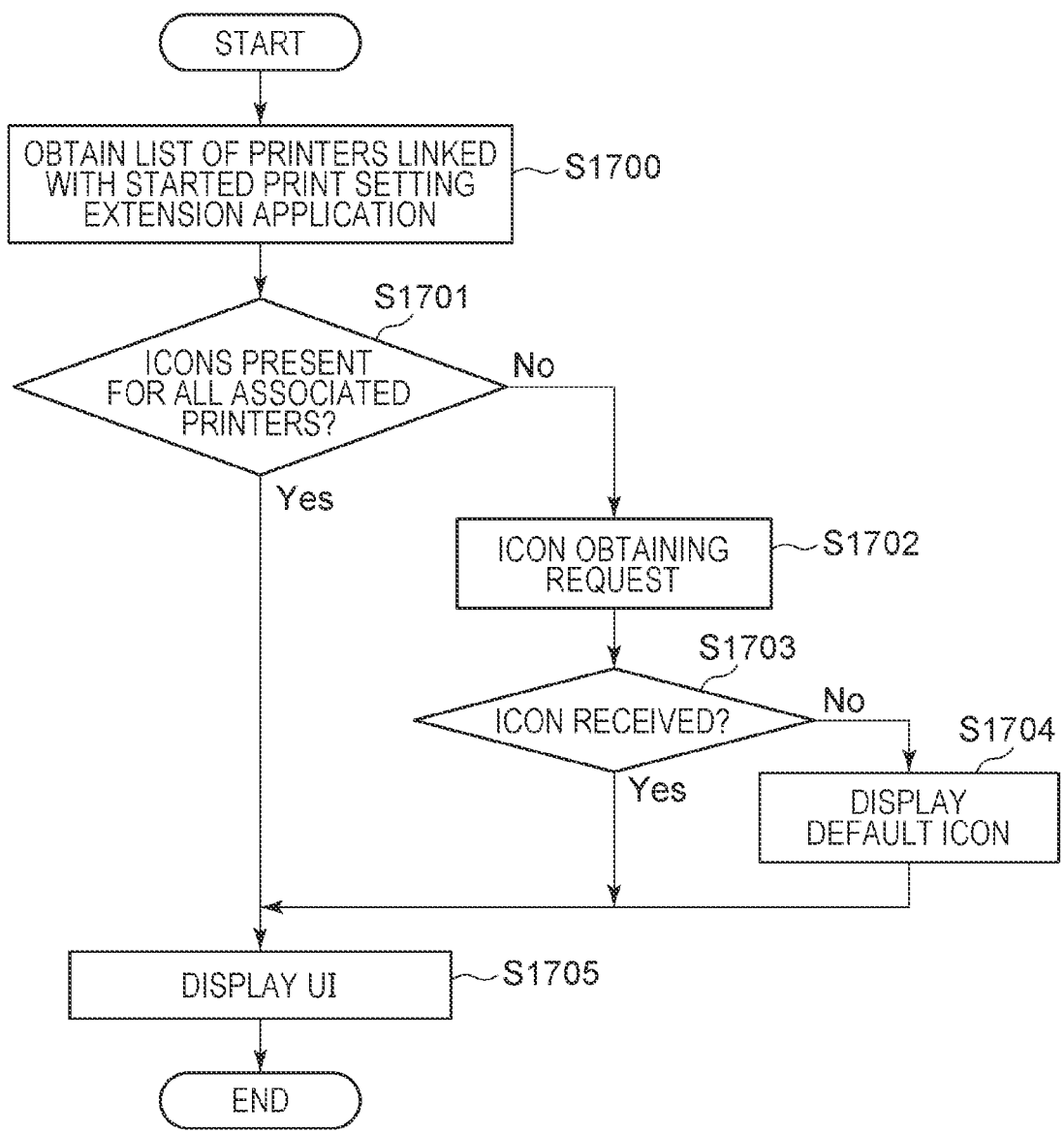
FIG. 17 is a flowchart of a process for obtaining an icon in Embodiment 4.

FIG. 17 is a flowchart of a process for obtaining an icon when the print setting extension application 1052 is started by a user. This flowchart starts with a user starting the print setting extension application 1052.

In step S1700, the print setting extension application 1052 that accepts a start instruction obtains a list of printers associated therewith. The print setting extension application 1052 may be linked with all printers listed in the driver extension package. Therefore, in step S1701, the print setting extension application 1052 needs to check the list of printers obtained in S1700 described above to see whether an icon linked with each printer is present. The print setting extension application 1052 checks to see whether each printer and an icon are linked with each other, and if a printer with which no icon is linked is present, the flow proceeds to S1702. In step S1702, an icon is obtained with the flow of a process illustrated in the sequence chart in FIG. 18. In S1800, the print setting extension application 1052 gives the operating system 1053 an icon request instruction. S1801 to S1805 are similar to steps described with reference to FIG. 11 as an example of S809 in FIG. 8, and therefore, a description thereof will be omitted. In S1806, the operating system 1053 passes an icon received in S1804 to the print setting extension application 1052.

Figure 18:
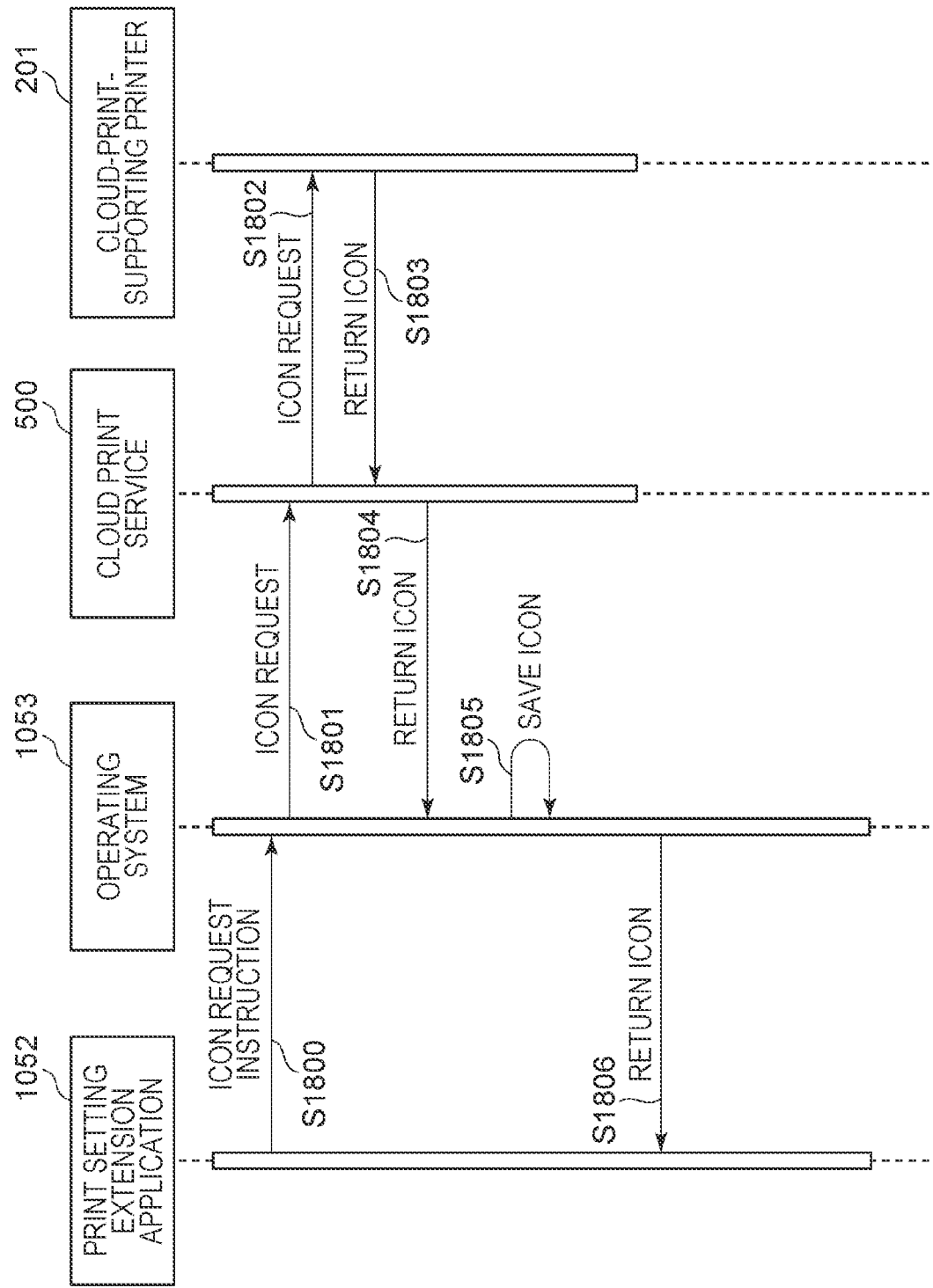
FIG. 18 is a sequence chart when an instruction for obtaining an icon image is given in Embodiment 4.
Figure 19:
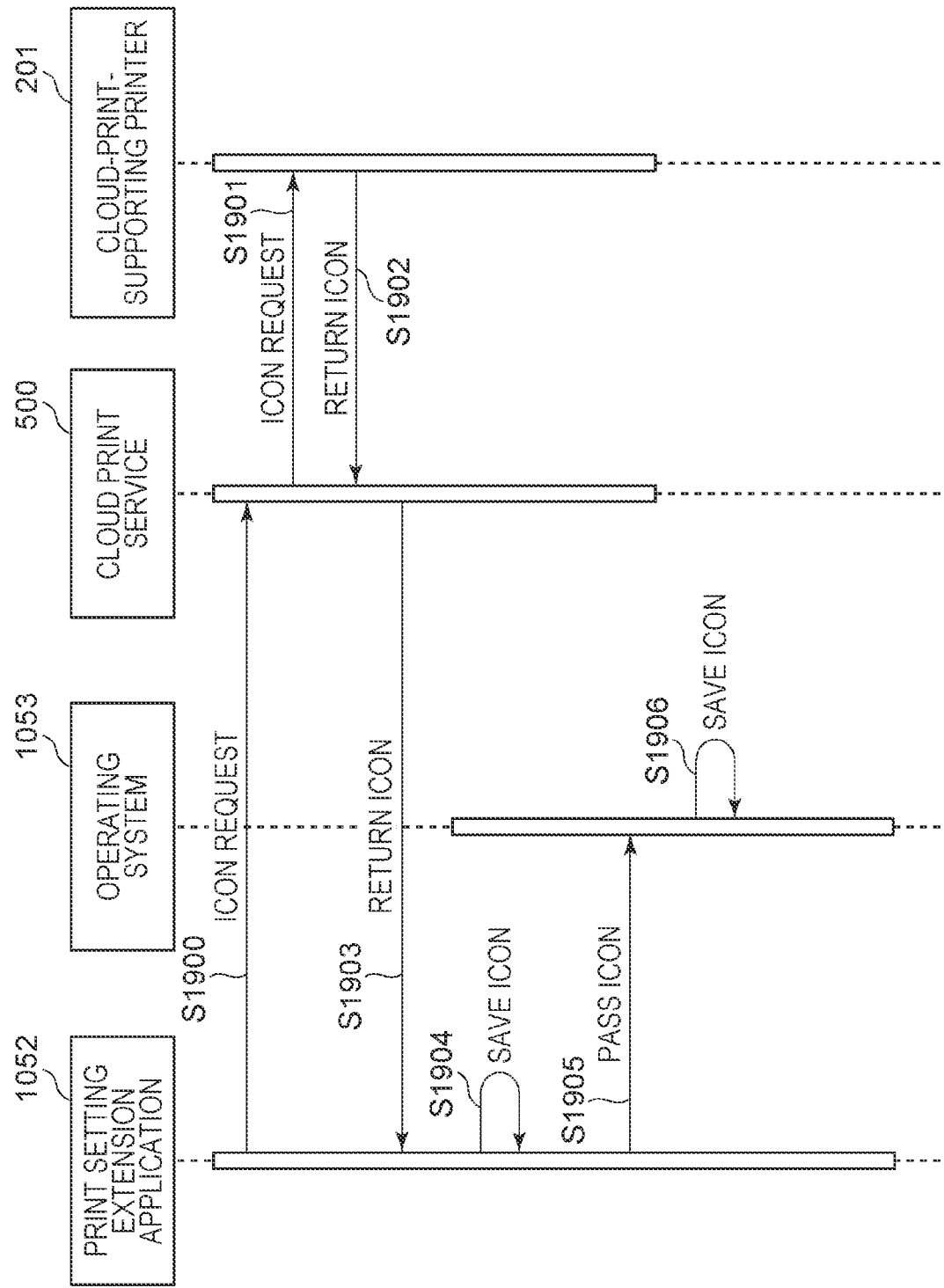
FIG. 19 is a sequence chart when an icon request is directly sent to the cloud print service in Embodiment 4.

FIG. 18 illustrates a sequence chart when the print setting extension application 1052 instructs the operating system 1053 to obtain an icon. In contrast, the print setting extension application 1052 may directly send an icon request to the cloud print service 500 without intervention by the operating system 1053 as illustrated in FIG. 19.

In this case, in S1900, the print setting extension application 1052 sends an icon request to the cloud print service 500. S1901 and S1902 are similar to S1101 and S1102 in FIG. 11, and therefore, a description thereof will be omitted. Next, in S1903, the cloud print service 500 passes an obtained icon to the print setting extension application 1052.

In S1904, the print setting extension application 1052 saves the icon received in S1903 described above while linking the icon with the printer concerned. In S1905, the print setting extension application 1052 passes the icon received in S1903 to the operating system 1053. In S1906, the operating system 1053 saves the received icon while linking the icon with the print queue of the printer concerned. In any of the cases illustrated in FIG. 18 and FIG. 19, a request for an icon may be sent to the cloud print service 500 as described. As described in Embodiment 3, a request for URL information indicating the icon storage location may be made, and the print setting extension application 1052 may subsequently make an icon obtaining request on the basis of the URL. The print setting extension application 1052 may retain in advance URL information indicating a location where an icon is stored, transmit an icon request addressed to the URL indicating the location where an icon is stored, with the HWID of a connected printer, which is a query parameter, and receive the icon.

If it is determined in S1703 that the print setting extension application 1052 does not successfully receive an icon in S1702 described above, the flow proceeds to S1704. In S1704, the print setting extension application 1052 identifies an attribute of the printer concerned, that is, a personal printer or an office printer, on the basis of information, such as a HWID or a marker-type, obtained with a procedure not illustrated. The print setting extension application 1052 may link a default icon in accordance with the identified attribute and save the icon. If it is determined in S1703 that the print setting extension application 1052 successfully receives an icon in S1702 described above, the print setting extension application 1052 saves the icon while linking the icon with the device concerned. In S1705, the print setting extension application 1052 displays a UI started after completion of linking of all printers linked with the started print setting extension application 1052 and icons with each other. As part of the content of display, the print setting extension application 1052 may display the icons saved in steps S1702 and S1704.

Embodiment 5

In Embodiments 1 and 2, a method for obtaining an icon in a flow in which printers are searched for and a driver for a selected printer is subsequently installed as illustrated in FIG. 8 has been described.

In Embodiment 5, a method in which the print setting extension application 1052 obtains an icon will be described.

Figure 20:
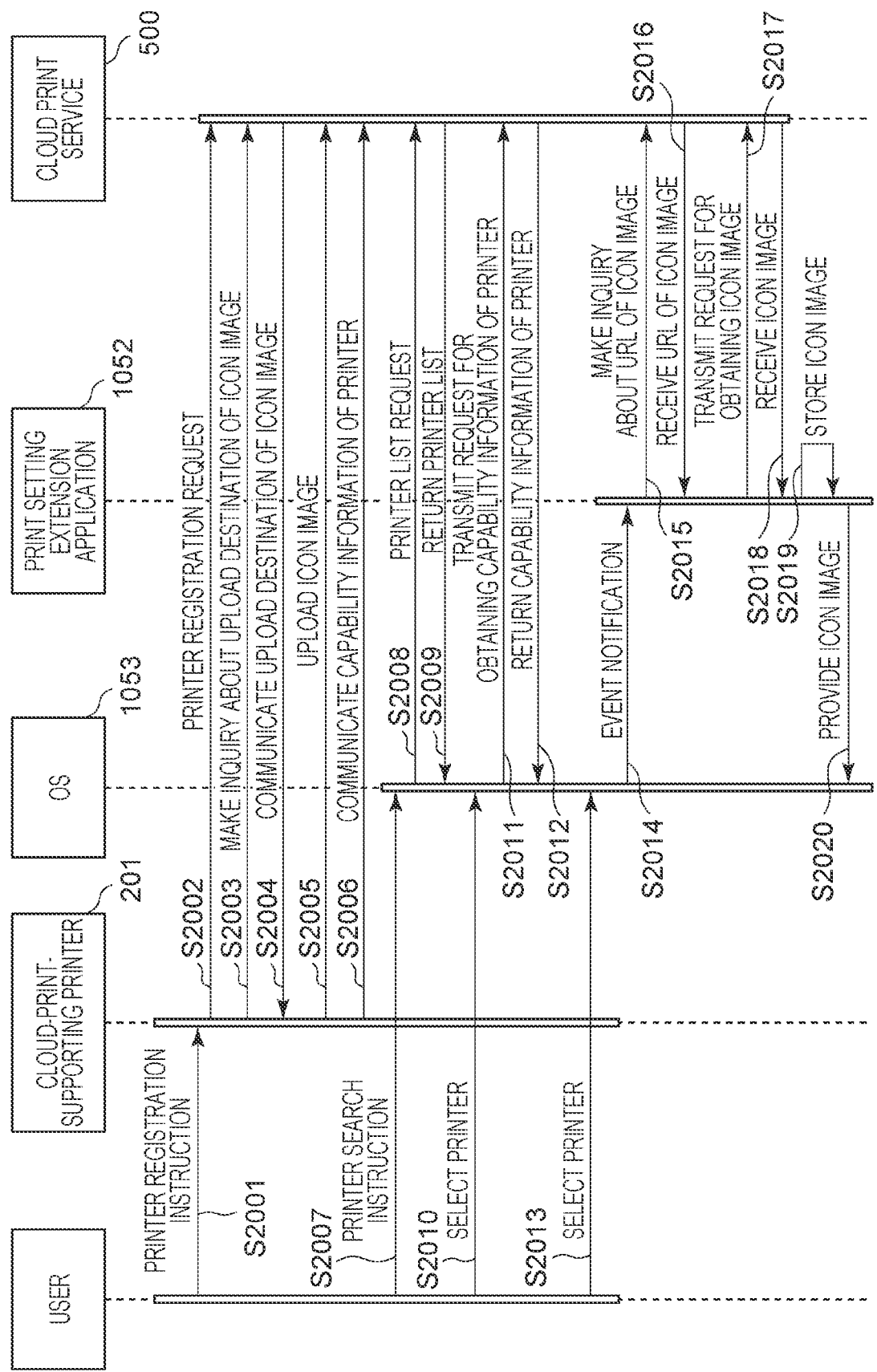
FIG. 20 is a sequence chart illustrating an example sequence of obtaining an icon image in Embodiment 5.

In FIG. 20, the cloud-print-supporting printer 201 registers an icon image in the cloud print service 500, and the print setting extension application 1052 installed in the client computer 100 obtains the icon image from the cloud print service 500.

In this embodiment, when registering printer information in the cloud print service 500, the cloud-print-supporting printer 201 uploads an icon of the cloud-print-supporting printer 201 to the cloud print service 500. The print setting extension application 1052 obtains the icon image from the cloud print service 500. This sequence chart starts with a user giving the cloud-print-supporting printer 201 an instruction for registration in the cloud print service 500.

In S2001, a user operates the operation unit 227 of the cloud-print-supporting printer 201 and inputs an instruction for registering information about the printer in the cloud print service 500. The instruction for registering may be given not by operating the operation unit 227 of the cloud-print-supporting printer 201 but by accessing a WEB server function of the cloud-print-supporting printer 201 from the client computer 100.

At this time, the user is authenticated for logging in to the cloud print service 500 with their own account. The cloud-print-supporting printer 201 displays an authentication screen provided by the cloud print service 500 and accepts input of user identification information and a password. The cloud-print-supporting printer 201 transmits the input user identification information and password to an authentication server not illustrated, and the user is authenticated.

When authentication is successful, the cloud-print-supporting printer 201 transmits a printer registration request to the cloud print service 500 in S2002. The printer registration unit 501 of the cloud print service 500 receives the printer registration request and performs processes. The printer registration unit 501 that receives the registration request uses the print queue generation unit 502 to generate a print queue. The printer registration unit 501 registers the generated print queue in the printer database 510 while linking the print queue with printer identification information. After the print queue is generated and registered in the printer database 510, the cloud print service 500 becomes able to transmit print data received from the client computer 100 to the cloud-print-supporting printer 201.

In S2003, the cloud-print-supporting printer 201 makes an inquiry about the upload destination of an icon image of the printer, to the cloud print service 500. The cloud-print-supporting printer 201 transmits the IPP operation Get-Printer-Attributes while specifying the print queue generated in S2002. At this time, as an argument of this operation, the cloud-print-supporting printer 201 sets the IPP attribute printer-static-resource-directory-uri. printer-static-resource-directory-uri is an argument for obtaining the URL of a storage that can store information about the printer. In S2003, the cloud-print-supporting printer 201 transmits the above-described inquiry to the cloud print service 500 together with an access token of the user using the cloud print service 500.

Next, in S2004, the cloud print service 500 sets a value of printer-static-resource-directory-uri for the cloud-print-supporting printer 201 and transmits a response. The value of printer-static-resource-directory-uri at this time is the location of an available storage corresponding to the print queue created in S2002. Specifically, a URL started with http or https, such as https://print.print-dev.com/ipp/resource/0cc23168-d681-49b4-bc22-ef704a024aff, is returned. The URL may have a structure as follows: https://<URL of cloud print service>/ipp/resource/<uniquely identified printer ID>. Here, the uniquely identified printer ID is an ID that is issued when the print queue is created and registered in the printer database 510 in S2002. As the "uniquely identified printer ID", a character string including, for example, the printer name, the serial number of the printer, or the IP address of the printer may be used.

In S2005, the cloud-print-supporting printer 201 that receives the value of printer-static-resource-directory-uri uploads the icon image to the location indicated by the URL. The icon image is an image stored in the storage unit 224 of the cloud-print-supporting printer 201. The process in S2005 will be described more specifically. The cloud-print-supporting printer 201 specifies the URL received from the cloud print service 500 and uploads the icon image by using the PUT request of HTTP. When the cloud-print-supporting printer 201 has a plurality of icons, the cloud-print-supporting printer 201 may upload a plurality of icon images when necessary.

Upon this uploading, the access token of the user is communicated to the cloud print service 500.

In S2003 to S2005, a process as described below may be performed. In S2003, the cloud-print-supporting printer 201 makes an inquiry about the available space of the upload destination in addition to the URL of the upload destination of the icon image. The cloud-print-supporting printer 201 makes the inquiry about the available space of a storage area to which the icon image is to be transmitted, by using printer-static-resource-k-octets-free defined in IPP. In S2004, the cloud-print-supporting printer 201 receives from the cloud print service 500, the available space of the storage area to which the icon image is to be transmitted. In S2005, the cloud-print-supporting printer 201 compares the available space received in S2004 with the data size of the icon image.

When the data size of the icon image is smaller than the received available space, the cloud-print-supporting printer 201 uploads the icon image to the specified storage area.

When the data size of the icon image is larger than the available space of the storage area, the cloud-print-supporting printer 201 does not upload the icon image.

Next, in S2006, the cloud-print-supporting printer 201 communicates capability information of the printer to the cloud print service 500. The capability information of the printer is information including a set value of a color mode, sheet sizes, sheet types, set values regarding finishing, and so on supported by the printer. The process in S2006 will be described more specifically. The cloud-print-supporting printer 201 transmits capability information of the printer to the cloud print service 500 by using Update-Output-Device-Attributes defined in IPP. At this time, the cloud-print-supporting printer 201 sets a value obtained by concatenating the upload destination and the name of the icon uploaded in S2005 in the IPP attribute printer-icons. For example, when the file name of the icon that the cloud-print-supporting printer 201 uploads in S2005 is 512.png, the set value is https://print.print-dev.com/ipp/resource/0cc23168-d681-49b4-bc22-ef704a024aff/512.png. When the cloud-print-supporting printer 201 uploads a plurality of icon images in S2005, the cloud-print-supporting printer 201 sets the same number of URLs in printer-icons and transmits Update-Output-Device-Attributes in IPP to the cloud print service 500. The cloud print service 500 that receives Update-Output-Device-Attributes in IPP overwrites the value of the IPP attribute printer-icons of the print queue created in S2002 with the communicated value. Accordingly, the cloud print service 500 can store the URL of the area in which the icon image is saved. A process for registering the printer in the cloud print service 500 has been described above.

A process for generating, in the OS 1053 of the client computer 100, a print queue for transmitting print data to a printer via the cloud print service 500 will now be described.

In S2007, the user operates the client computer 100 and gives the OS 1053 a printer search instruction. This instruction is accepted by a UI (not illustrated) provided by the OS 1053.

The OS 1053 that accepts the printer search instruction transmits a printer list request to the cloud print service 500 (S2008). The OS 1053 transmits an access token for obtaining a printer list from the cloud print service 500 and a printer list request to the cloud print service 500. When the OS 1053 does not have the access token for the cloud print service 500, the following process may be performed. The client computer 100 displays a screen for inputting a user ID and a password for logging in to the cloud print service 500 and performs a process for obtaining the access token. The access token for obtaining a printer list from the cloud print service 500 may be obtained with the above-described process, and the process in S2008 may be performed. In S2008, the OS 1053 may additionally search for printers that directly communicate with the client computer 100 without using the cloud print service 500. The obtained access token is used also in subsequent S2011.

The cloud print service 500 transmits the identifiers of one or more printers available to the user identified with the received access token to the OS 1053 (S2009). The OS 1053 displays the received identifiers of one or more printers on a display unit of the client computer 100. The identifiers of printers are printer names registered in the cloud print service 500 in association with the respective printers. In S2009, the OS 1053 also receives the HWIDs of the printers from the cloud print service 500.

In S2010, the user operates the client computer 100 and selects the identifier of a printer for which a print queue is to be generated, from among the displayed identifiers of one or more printers. The OS 1053 stores the identifier of the selected printer and the identifier of a printer driver for the cloud print service 500 in the main storage device 102 in association with each other. The OS 1053 transmits a request for obtaining capability information of the printer linked with the print queue to the cloud print service 500 (S2011). In S2011, the OS 1053 obtains capability information of the printer from the cloud print service 500 by using the Get-Printer-Attribute command defined in IPP.

In S2012, the cloud print service 500 transmits capability information of the printer registered in S2002 to the OS 1053. The capability information obtained in S2012 includes, for example, set values that can be set for setting items including a color mode, whether both-side printing is allowed, stapling, and so on. The OS 1053 stores the received capability information in association with the print queue. Accordingly, printer capability information is managed on a print-queue by print-queue basis. The OS 1053 identifies the print setting extension application 1052 corresponding to the printer concerned by using the HWID received in S2009. The OS 1053 stores the print queue and the identifier of the identified print setting extension application 1052 in association with each other.

The process in S2007 to S2012 is a process for generating the print queue in the client computer 100.

A process that is performed when an application is started in the client computer 100 and a print instruction is given will now be described. The application described above is an application, such as a document creation application, a presentation application, or a file display application.

In S2013, the user selects a printer to be used in printing. In S2014, the OS 1053 sends a notification of an event to the print setting extension application 1052. In association with this event, an API (Application Programming Interface) that can be used in editing of device capability information in the selected printer and making of an inquiry about capabilities to a device is communicated to the print setting extension application 1052.

In S2015, the print setting extension application 1052 makes an inquiry about the URL of an area in which an icon image is stored, to the cloud print service 500. Specifically, the print setting extension application 1052 transmits the IPP operation Get-Printer-Attributes to the cloud print service 500. At this time, as an argument of this operation, the print setting extension application 1052 sets the IPP attribute printer-icons. Accordingly, the print setting extension application 1052 can send a request for a value of the IPP attribute printer-icons to the cloud print service 500. The cloud print service 500 that receives the request for a value returns the value of the IPP attribute printer-icons of the target printer to the print setting extension application 1052.

In S2016, the print setting extension application 1052 obtains the URL of an area in which an icon image of the selected printer linked with the print queue is stored, from the cloud print service 500.

In S2017, the print setting extension application 1052 transmits a request for obtaining the icon image while specifying the URL received in S2016. The print setting extension application 1052 transmits the GET request of HTTP addressed to the received URL.

In S2018, the print setting extension application 1052 receives the icon image from the cloud print service 500. In S2019, the print setting extension application 1052 stores the received icon image in association with the print queue.

In S2020, the print setting extension application 1052 provides the icon image received in S2018 to the OS 1053.

When the obtained icon image is provided to the OS 1053, the icon image provided by the cloud-print-supporting printer 201 can be used also in, for example, a printer management screen provided by the OS 1053.

Figure 21:
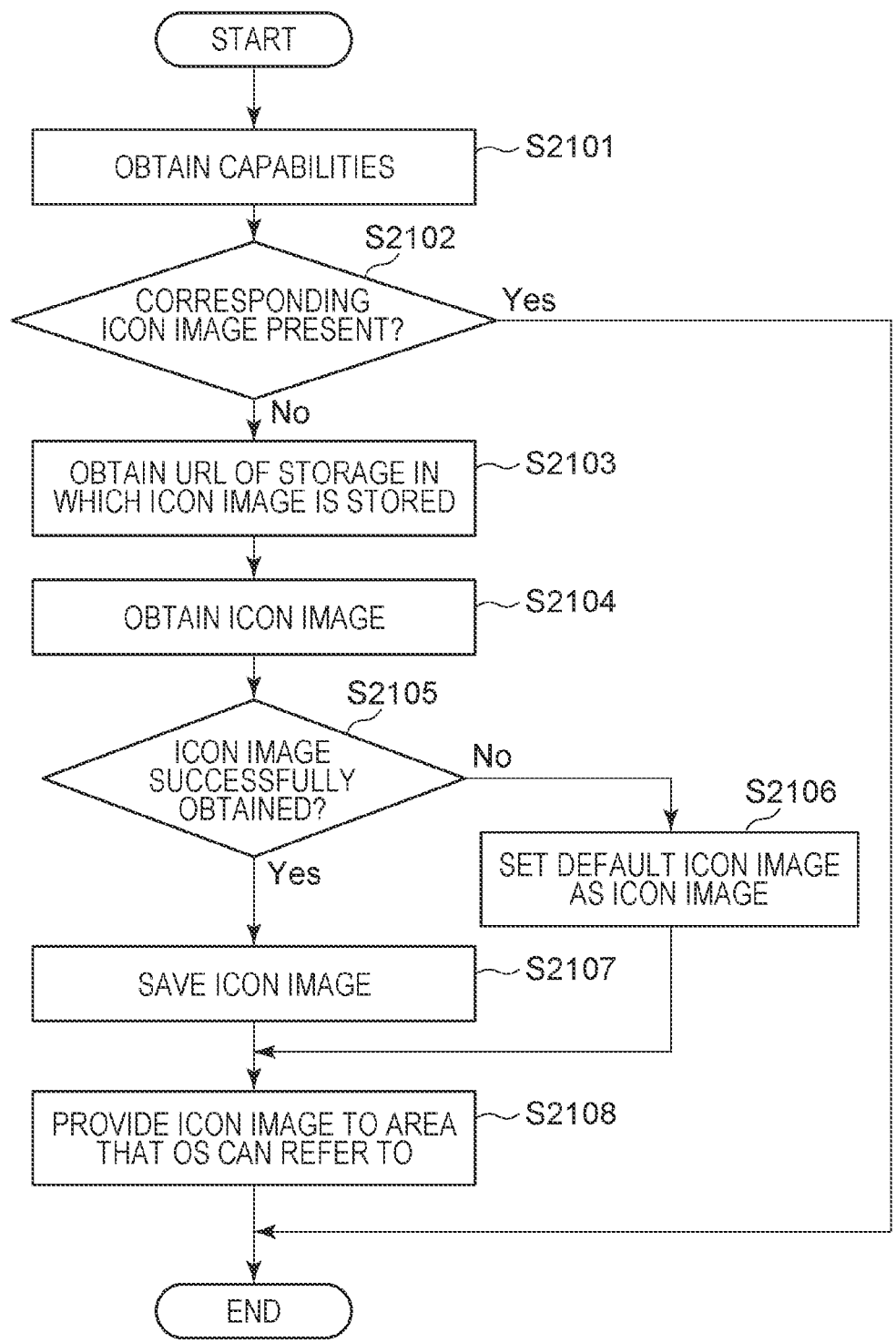
FIG. 21 is a flowchart illustrating obtaining of an icon image in Embodiment 5.

FIG. 21 is a flowchart of a process in which the print setting extension application 1052 that receives the event notification obtains an icon of the printer selected in S2013 from the cloud print service 500. FIG. 21 is a flowchart illustrating in detail the process in S2013 to S2020 in FIG. 20. Each step illustrated in FIG. 21 is implemented by the CPU 101 of the client computer 100 executing a program of the print setting extension application 1052.

In S2101, the print setting extension application 1052 obtains capability information from the cloud print service 500. The print setting extension application 1052 transmits a request for obtaining capability information to the cloud print service 500 by using the API provided by the OS 1053. The OS 1053 obtains capability information of the printer selected in S2013 from the cloud print service 500 by using Get-Printer-Attribute defined in IPP. The capability information obtained here is capability information regarding a color mode, both-side printing, stapling, and so on defined in IPP. In addition to the capability information described above, unique capability information not defined in IPP may be obtained. When the OS 1053 does not store the access token used in obtaining capability information from the cloud print service 500, the OS 1053 performs the following process. The OS 1053 displays a screen for inputting a user ID and a password for using the cloud print service 500. The OS 1053 transmits a user ID and a password input to the input screen to an authentication server for the cloud print service 500. When authentication is successful, the OS 1053 receives an access token from the authentication server and stores the access token. The stored access token is also used in S2103 and S2104 in addition to S2101.

In S2102, the print setting extension application 1052 that receives the event notification checks whether an icon image of the printer selected in S2013 is stored. The print setting extension application 1052 determines whether an icon image associated with the print queue of the selected printer is stored. If an icon image corresponding to the print queue is stored or a default icon image is stored as an icon image corresponding to the print queue, the print setting extension application 1052 ends the process illustrated in FIG. 21.

If an icon image of the selected printer is not stored, the print setting extension application 1052 makes the process proceed to S2103.

In S2103, the print setting extension application 1052 obtains the URL of a storage in which an icon image is stored for the connected printer. Specifically, the print setting extension application 1052 obtains the URL of a storage in which the icon image is stored, by using the API provided by the OS 1053. The OS 1053 transmits the IPP operation Get-Printer-Attributes to the cloud print service 500. At this time, as an argument of this operation, the OS 1053 sets the IPP attribute printer-icons.

Accordingly, the print setting extension application 1052 can send a request for a value of the IPP attribute printer-icons to the cloud print service 500. The cloud print service 500 that receives the request for a value returns the value of the IPP attribute printer-icons of the target printer.

Next, in S2104, the print setting extension application 1052 obtains an icon image. The process will be specifically described below. The print setting extension application 1052 transmits the GET request of HTTP addressed to the URL, which is the value of the IPP attribute printer-icons, obtained in S2103, by using the API provided by the OS 1053. The cloud print service 500 that receives the GET request transmits an icon image stored in the storage indicated by the received URL to the print setting extension application 1052. At this time, when the IPP attribute printer-icons has a plurality of values, icon images may be obtained for the values by using the GET request of HTTP.

Next, in S2105, the print setting extension application 1052 determines whether an icon image is successfully obtained. If an icon image is successfully obtained, the print setting extension application 1052 makes the process proceed to S2107. On the other hand, if an icon image is not successfully obtained, the print setting extension application 1052 makes the process proceed to S2106.

In S2106, the print setting extension application 1052 stores a default icon, which is an icon of a general printer saved in a local area thereof, as an icon image of the printer. The print setting extension application 1052 stores the icon image that the application stores in advance, in association with the printer selected in S2013.

In S2107, the print setting extension application 1052 saves the icon image obtained in S2104 in the local area of the application in association with the printer selected in S2013.

In S2108, the print setting extension application 1052 provides the icon image obtained in S2104 to the OS 1053. The OS 1053 that receives the icon image saves the icon image while linking the icon image with the print queue of the printer selected in S2013. At this time, the OS 1053 stores the icon image in a storage area under a file system of the OS 1053. This storage area is an area that the OS 1053 can refer to but the print setting extension application 1052 is not allowed to refer to.

The OS 1053 stores the icon image in the area that the OS 1053 can refer to, and the print setting extension application 1052 ends the process illustrated in FIG. 21.

When the above-described process is performed, the icon image is stored in both the local area of the print setting extension application 1052 that the print setting extension application 1052 can refer to and the storage area under the file system of the OS 1053 that the OS 1053 refers to. The icon image stored in each area is used as follows.

The icon image stored in the local area of the print setting extension application 1052 is used when the print setting extension application 1052 starts and displays a screen on which printer information managed by the print setting extension application 1052 is displayed.

When the print setting extension application 1052 is selected on a screen on which a list of applications installed in the client computer 100 is displayed and the print setting extension application 1052 starts, the screen illustrated in FIG. 14 is displayed. The screen illustrated in FIG. 14 is a screen on which a list of printers linked with the print setting extension application 1052 is displayed. In FIG. 14, an icon image of "Printer A" associated with the print setting extension application 1052 is displayed. Although an icon image of one printer is displayed in FIG. 14, when the print setting extension application 1052 is associated with a plurality of printers, icon images of the plurality of printers are displayed. On this screen, all printers linked only with the print setting extension application 1052 are listed, and the toner level, the printer state, and so on can be checked on a printer-by-printer basis. On this screen, the saved icon image is used so as to allow the user to easily identify the printer.

The OS 1053 displays the saved icon image on the screen system, of the operating system 1053, displaying a list of peripheral devices (that is, the printer management screen for managing devices, such as printers, from various vendors) as illustrated in FIG. 13. FIG. 13 is a screen provided by the OS 1053 and is a screen for managing print queues registered in the OS 1053 of the client computer 100. When an icon image provided by a printer or a default printer icon stored in the print setting extension application 1052 is not used, an icon image provided by the OS 1053 is displayed. When this embodiment is implemented and the icon image provided by the OS 1053 is replaced with an icon image obtained by the print setting extension application 1052, the visibility of the user is increased and the user becomes able to easily identify the printer.

With reference to FIG. 20 and FIG. 21, a case where an icon image is obtained at the timing when a printer is selected on the print setting screen has been described. However, the timing when the print setting extension application 1052 obtains an icon image may be the timing when the user starts the print setting extension application 1052. A system for obtaining an icon image at the timing when the print setting extension application 1052 starts will be described below.

Figure 22:
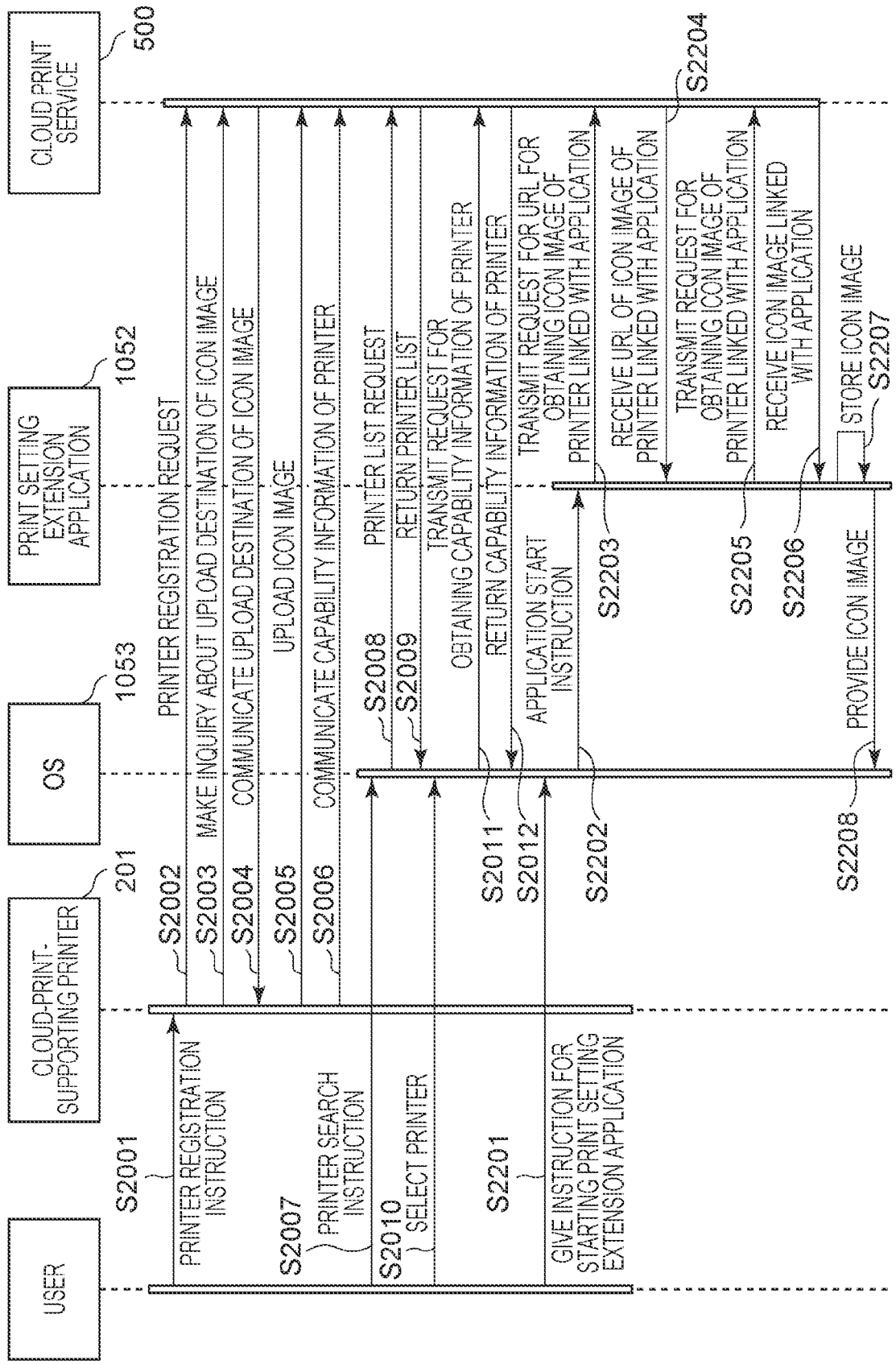
FIG. 22 is a sequence chart illustrating an example sequence in which an icon image is obtained when the print setting extension application is started in Embodiment 5.

FIG. 22 is a sequence chart of a case where an icon image that a printer has uploaded to the cloud print service 500 is obtained from the cloud print service 500 when a user opens the print setting extension application 1052. In FIG. 22, a step in which a process similar to that in FIG. 20 is performed is assigned the same reference numeral as in FIG. 20, and a description thereof will be omitted.

In S2201, a user opens the print setting extension application 1052. In S2202, the OS 1053 gives the print setting extension application 1052 a start instruction.

In S2203, the print setting extension application 1052 transmits to the cloud print service 500, a request for obtaining a URL for obtaining an icon image of a printer managed by the application. In S2204, the cloud print service 500 transmits to the print setting extension application 1052, the URL of a storage area in which an icon image of the printer specified by the print setting extension application 1052 is stored. In S2205, the print setting extension application 1052 transmits a request for obtaining the icon image addressed to the specified URL. In S2206, the print setting extension application 1052 obtains the icon image from the cloud print service 500. In S2207, the print setting extension application 1052 associates the obtained icon image with the identifier of the printer managed by the print setting extension application 1052 and stores the icon image in a storage area that the print setting extension application 1052 can refer to. In S2208, the print setting extension application 1052 passes the icon image to the OS 1053, and the OS 1053 stores the icon image in the saving area under the file system of the OS 1053 in association with the print queue.

Figure 23:
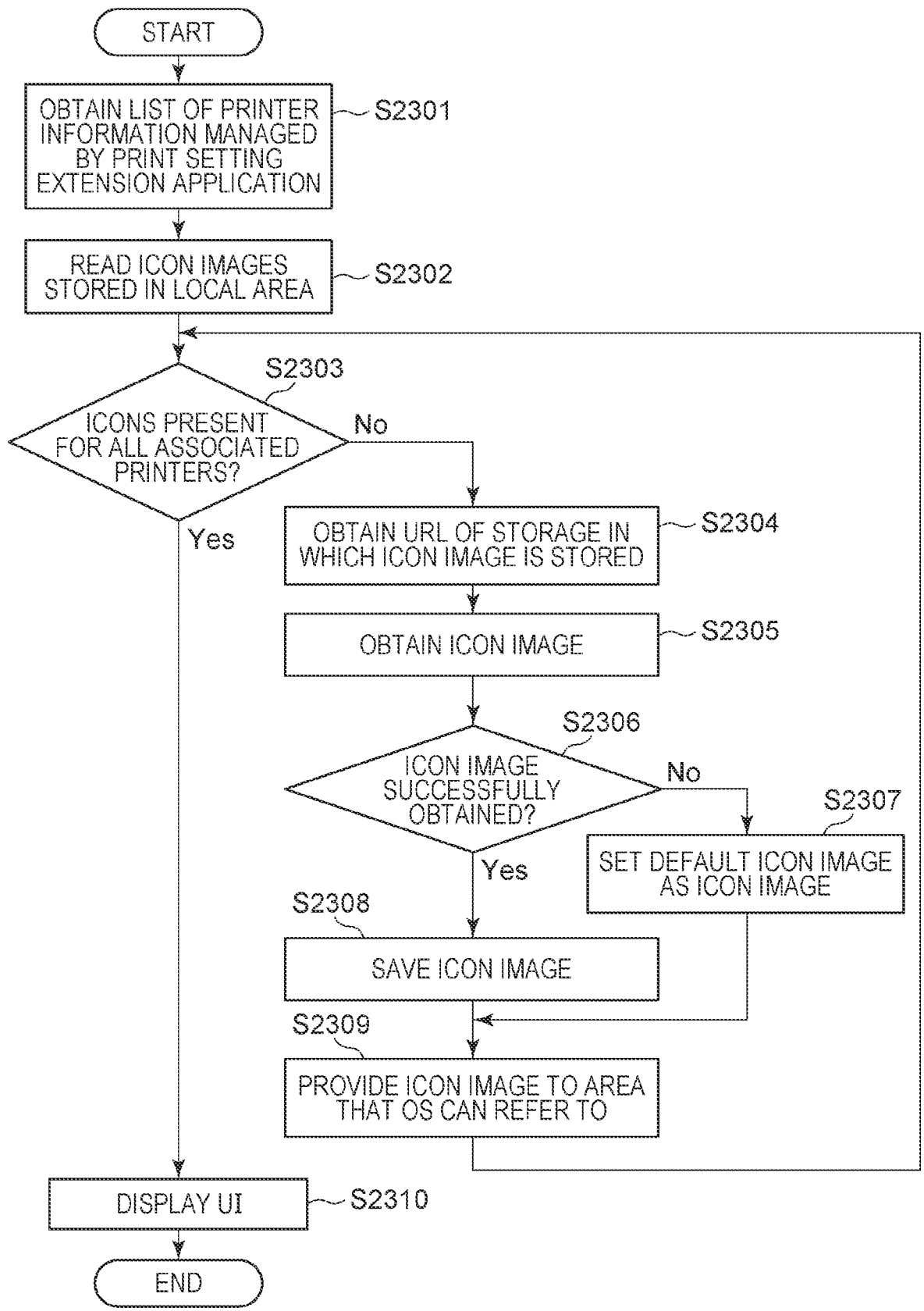
FIG. 23 is a flowchart illustrating a process in which an icon image is obtained when the print setting extension application is started in Embodiment 5.

FIG. 23 is a flowchart of a process in which the print setting extension application 1052 that receives the application start instruction in S2201 obtains icons of printers from the cloud print service 500. FIG. 23 illustrates in detail the process in S2203 to S2208 in FIG. 22. The process illustrated in FIG. 23 is implemented by the CPU 101 executing a program of the print setting extension application 1052.

In S2301, the print setting extension application 1052 obtains a list of pieces of printer information of printers linked therewith. More specifically, the print setting extension application 1052 obtains information about print queues managed by the OS 1053. The print setting extension application 1052 determines whether the value of package family name stored as a property of each of the obtained print queues is equal to the value of package family name stored in the print setting extension application 1052. package family name is identification information of an application. The OS 1053 stores a print queue and identification information of an application in association with each other, and therefore, can call an application corresponding to a print queue selected by the user. The print setting extension application 1052 refers to the value of device package family name of each print queue to thereby identify a print queue linked with the application. Alternatively, the print setting extension application 1052 may obtain a list of linked printers by using the API received from the OS 1053 when the print setting extension application 1052 is opened.

In S2302, the print setting extension application 1052 reads icon images stored in the local area of the print setting extension application 1052. Although icon images are read in this embodiment, other information based on which the presence or absence of an icon image corresponding to each of the obtained pieces of printer information can be checked may be read.

In S2303, the print setting extension application 1052 determines whether icon images associated with all print queues associated with the application are stored. In S2303, the print setting extension application 1052 determines whether an icon image corresponding to each piece of printer information included in the list of pieces of printer information read in S2301 is read in S2302. If icon images corresponding to all print queues are stored, the print setting extension application 1052 makes the process proceed to S2310. If a print queue for which a corresponding icon image is not stored is present, the print setting extension application 1052 makes the process proceed to S2304.

In S2304, the print setting extension application 1052 selects one print queue for which an icon image is not stored and transmits to the cloud print service 500, a request for obtaining the URL of a storage in which the icon image corresponding to the selected print queue is stored. More specifically, the print setting extension application 1052 obtains the URL of a storage in which the icon image is stored, by using the API of the OS 1053. A command used in S2304 is the same as that used in S2103. The print setting extension application 1052 receives the URL of a storage in which the icon image is stored, from the cloud print service 500 that receives the obtaining request described above.

In S2305, the print setting extension application 1052 obtains the icon image from the storage indicated by the received URL. The details of the process for obtaining the icon image is similar to the process in S2104 in FIG. 21.

In S2306, the print setting extension application 1052 determines whether the icon image is successfully obtained. If the icon image is successfully obtained, the print setting extension application 1052 makes the process proceed to S2308. On the other hand, if the icon image is not successfully obtained, the print setting extension application 1052 makes the process proceed to S2307.

In S2308, the print setting extension application 1052 stores the obtained icon image in the local area of the print setting extension application 1052 in association with the print queue selected in S2304. In S2307, the print setting extension application 1052 stores an icon image that the application stores in advance, in association with the print queue selected in S2304. The print setting extension application 1052 stores a default icon image selected on the basis of a HWID (hardware ID) or a COID (compatible ID) associated with the print queue, in the local area of the application in association with the print queue.

In S2309, the print setting extension application 1052 provides the icon image set in S2307 or S2308 to the OS 1053. The OS 1053 that receives the icon image saves the icon image while linking the icon image with the print queue, of the printer, selected in S2304. At this time, the OS 1053 stores the icon image in the storage area under the file system of the OS 1053. This storage area is an area that the OS 1053 can refer to but the print setting extension application 1052 is not allowed to refer to.

After the process in S2309, the print setting extension application 1052 makes the process return to S2303. The print setting extension application 1052 performs the process in S2304 to S2309 until icon images are stored for all print queues corresponding to the print setting extension application 1052.

In S2310, the print setting extension application 1052 displays the above-described screen illustrated in FIG. 14 and displays icon images saved in the local area of the application as icons of respective linked printers. Accordingly, the user can visually identify the printers easily. In the case illustrated in FIG. 23, the obtained icon image is provided to the OS 1053 in S2309, and therefore, icon images of respective devices are displayed on the screen system, of the OS 1053, displaying a list of peripheral devices (that is, the printer management screen for managing devices, such as printers, from various vendors) as illustrated in FIG. 13.

Although methods in which an icon is obtained at different timings in a case where a user selects a printer and a case where a user opens the print setting extension application 1052 have been described with reference to FIG. 20 and FIG. 22 respectively, both methods may be employed, and an icon may be obtained at each of the timings.

Accordingly, in Embodiment 5, even when the OS 1053 does not perform a process for obtaining an icon image, an icon image registered in the cloud print service 500 can be displayed on the client computer 100.

Embodiment 6

A method in which the OS 1053 obtains an icon and passes the icon to the print setting extension application 1052 or the print setting extension application 1052 passes an obtained icon to the OS 1053 has been described above. However, from the viewpoint of security, the OS 1053 might not permit access to an obtained icon or to a system area. In this case, each of the print setting extension application 1052 and the OS 1053 rather than only one of them needs to obtain, retain, and use an icon image.

In Embodiment 6, a method in which each of the OS 1053 and the print setting extension application 1052 obtains an icon image will be described.

The process in S2001 to S2006 in FIG. 20 of Embodiment 5 is similarly performed in Embodiment 6, and therefore, a description thereof will be omitted.

In Embodiment 6, when the OS 1053 generates a print queue in the client computer 100, the OS 1053 obtains an icon image from the cloud print service 500.

Figure 24:
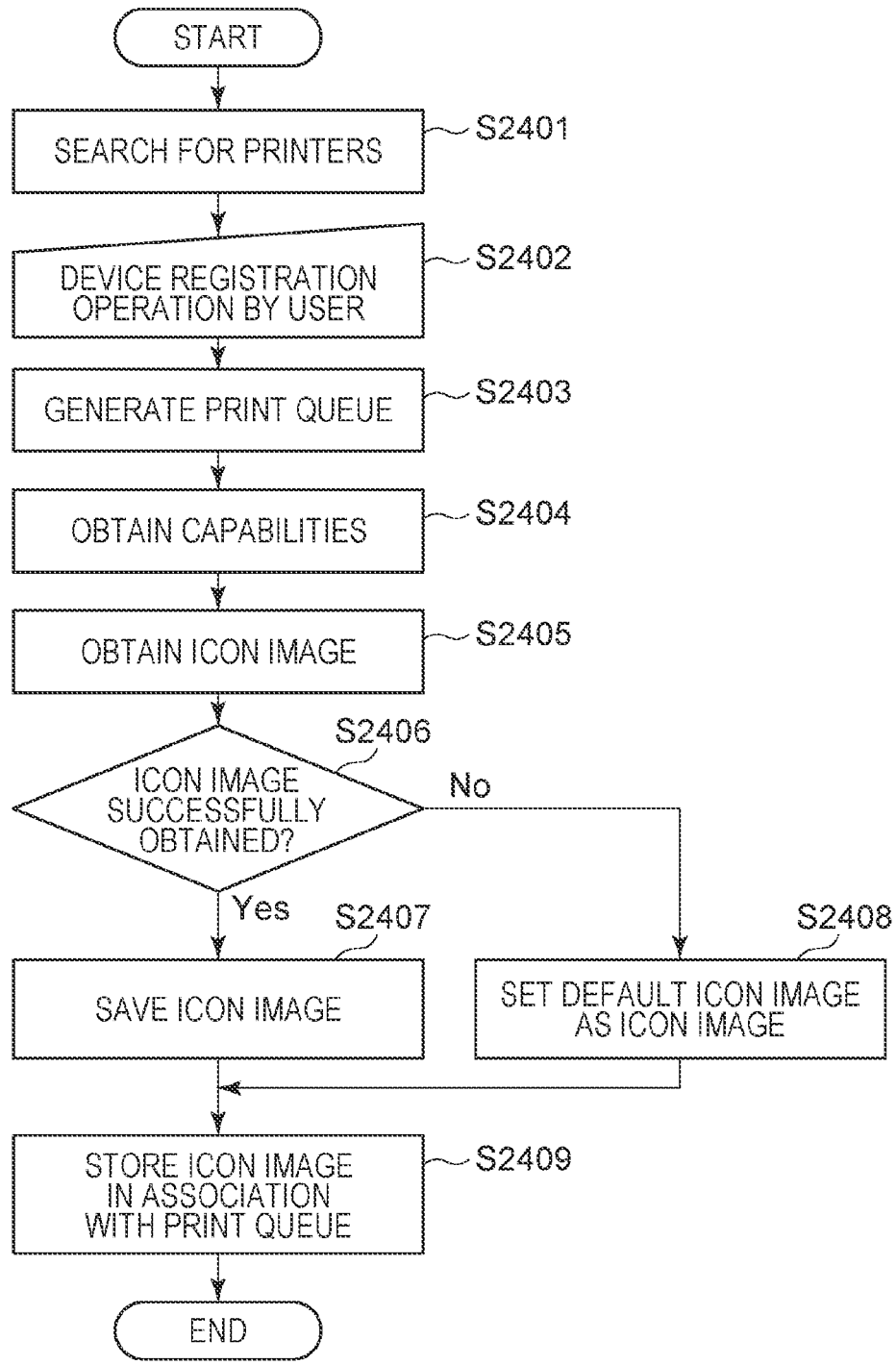
FIG. 24 is a flowchart illustrating a process in which the OS obtains an icon image in Embodiment 6.

FIG. 24 is a flowchart of a case where the OS 1053 obtains an icon when the OS 1053 installs a printer driver. Each process illustrated in FIG. 24 is implemented by the CPU 101 executing a program provided by the OS 1053.

In S2401, the OS 1053 makes a search by using a protocol such as WSD (Web Services for Devices) or IPP (Internet Printing Protocol) and lists the identifiers of detected printers. At this time, when a valid account for the cloud print service 500 is registered, the identifiers of accessible printers in a tenant of the cloud print service 500 corresponding to the account are also listed. When the OS 1053 does not store an access token used in obtaining a printer list from the cloud print service 500, the OS 1053 performs the following process in S2401. The OS 1053 displays a screen for inputting a user ID and a password for logging in to the cloud print service 500. The OS 1053 transmits an input user ID and an input password to an authentication server for the cloud print service 500.

When authentication is successful, the OS 1053 receives and stores an access token for the cloud print service 500. The received access token is also used in obtaining information from the cloud print service 500 in S2404 and S2405.

Next, in S2402, the OS 1053 performs a process for registering the identifier of a printer in the OS 1053, from the identifiers of the detected printers. In S2402, an operation is specifically performed as described below. The user selects the identifier of a printer to be registered in the OS 1053 from information about the listed printers.

In S2403, the OS 1053 generates a print queue on the basis of the identifier of the printer accepted in S2402. In this embodiment, the subsequent flow will be described under the assumption that a printer on the cloud print service 500 is selected.

In S2404, the OS 1053 makes an inquiry about capability information of the printer chosen in S2403 to the cloud print service 500. The capability information here is information indicating functions of the printer and includes color information, sheet sizes, sheet types, and so on. The URL of a storage in which an icon image is stored is also handled as capability information. This capability information is obtained by using the IPP operation Get-Printer-Attributes. An IPP attribute that is set at this time is chosen by the OS 1053. The IPP attribute includes, for example, output-mode-supported (color information) and media-type-supported (sheet types). In this embodiment, to obtain an icon image from the cloud print service 500, the OS 1053 needs to set the IPP attribute printer-icons when obtaining capability information by using Get-Printer-Attributes. As described above, when this operation is performed, the OS 1053 can obtain from the cloud print service 500, capability information including the URL of a storage in which an icon is stored. Even when each IPP attribute is not explicitly set for the operation Get-Printer-Attributes in order to obtain capability information, "all" may be set to thereby obtain the values of all IPP attributes and the values may be checked.

In S2405, the OS 1053 performs a process for obtaining an icon image. More specifically, the OS 1053 transmits the GET request of HTTP for the value of a URL in the IPP attribute printer-icons obtained in S2404. At this time, when the values of a plurality of URLs are saved, an attempt to obtain an icon image may be made a number of times equal to the number of URLs.

In S2406, the OS 1053 determines whether an icon image is successfully obtained.

If an icon image is successfully received in S2405, the OS 1053 makes the process proceed to S2407. On the other hand, if an icon image is not successfully obtained, the OS 1053 makes the process proceed to S2408. When an effective URL is not included in the IPP attribute printer-icons, the OS 1053 makes the process proceed to S2408.

In S2407, the OS 1053 saves the obtained icon image under the system in order to link the icon image with the print queue and stores the print queue and the file path of the storage in association with each other.

In S2408, the OS 1053 stores the path of a retained default icon image for linking with the print queue. The default icon image here is an icon image that the OS 1053 stores in advance and is an image different from a default icon image that the print setting extension application 1052 stores in Embodiment 5.

Next, in S2409, the OS 1053 stores the icon image in association with the print queue on the basis of a printer name obtained in S2401, the capability information obtained in S2404, and the path of the icon image stored in S2407 or S2408.

Accordingly, when an icon image is successfully obtained in S2405, the precise icon image can be displayed on the screen system, of the OS 1053, displaying a list of peripheral devices (that is, the printer management screen for managing devices, such as printers, from various vendors) (FIG. 13) and the user can visually identify the printer more easily than in a case of the default icon.

A method in which the print setting extension application 1052 obtains an icon image will now be described. The print setting extension application 1052 can obtain an icon image at the following two timings. The first timing is the timing when the print setting extension application 1052 is selected on a screen of a list of applications stored in the client computer 100 and is started. The second timing is the timing when a user gives a print instruction from another application different from the print setting extension application 1052 and selects the identifier of a printer to be used in printing. Systems in the respective cases will be described below.

Figure 25:
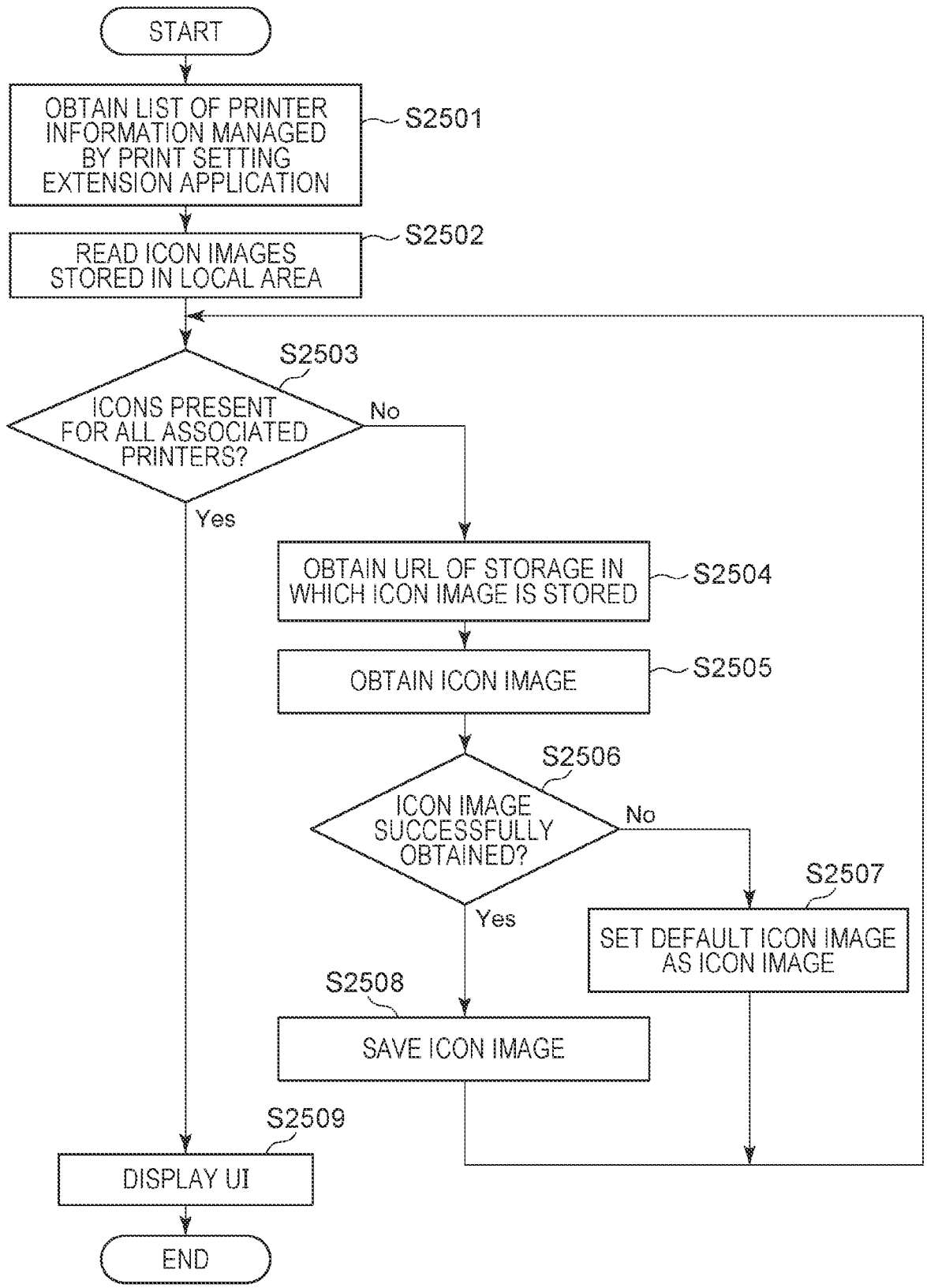
FIG. 25 is a flowchart illustrating a process in which an icon image is obtained when the print setting extension application is started in Embodiment 6.

FIG. 25 is a flowchart illustrating a process that is performed by the print setting extension application 1052 at a timing corresponding to the first timing described above. That is, FIG. 25 is a flowchart illustrating a process in which an icon is obtained from the cloud print service 500 when the print setting extension application 1052 is opened from a list of applications, and a UI is displayed. The process illustrated in FIG. 25 is a process implemented by the CPU 101 executing a program of the print setting extension application 1052.

S2501 to S2508 are similar to S2301 to S2308 in FIG. 23, and therefore, a description thereof will be omitted. A difference from Embodiment 5 is that the process of providing an icon image obtained by the print setting extension application 1052 to the OS 1053 after S2508 or S2507 is not performed.

As described above, in Embodiment 6, the OS 1053 obtains an icon image from the cloud print service 500 at the timing when a print queue is generated, and therefore, the print setting extension application 1052 does not provide an icon image.

In S2509, the print setting extension application 1052 displays icon images obtained and saved in S2501 to S2508 on the screen of the print setting extension application 1052 illustrated in FIG. 14 as icons of supported printers.

A process that is performed when an icon image is obtained at the second timing described above will now be described.

That is, a process of obtaining an icon image at the timing when a user selects a printer will be described.

Figure 26:
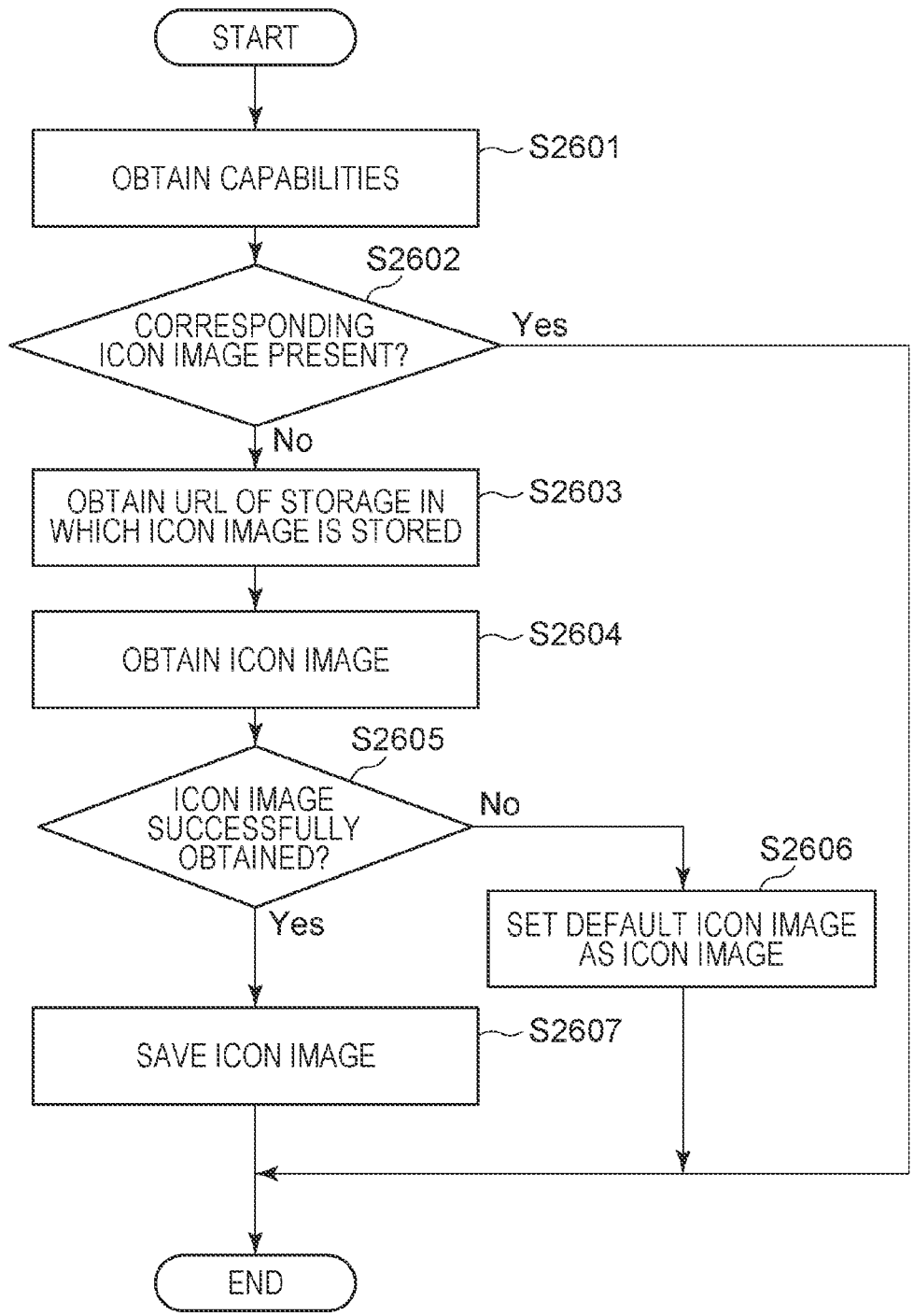
FIG. 26 is a flowchart illustrating a process in which the print setting extension application obtains an icon image when a printer used in printing is selected in Embodiment 6.

FIG. 26 is a flowchart illustrating processes in which the print setting extension application 1052 obtains an icon when a user selects a printer. Each process illustrated in FIG. 26 is implemented by the CPU 101 executing a program provided by the print setting extension application 1052.

S2601 to S2607 are similar to S2101 to S2107 in FIG. 21, and therefore, a description thereof will be omitted. A difference from Embodiment 5 is that the process of providing an icon image obtained by the print setting extension application 1052 to the OS 1053 after S2606 or S2607 is omitted. The OS 1053 obtains an icon image when generating a print queue in the client computer 100. Therefore, the print setting extension application 1052 does not provide an icon image to the OS 1053.

As described above, each of the OS 1053 and the print setting extension application 1052 obtains and retains an icon image. Accordingly, on both the screen provided by the print setting extension application 1052 and the screen provided by the OS 1053, the icon image corresponding to a printer can be displayed.

In Embodiment 6, a description of a case where the OS 1053 obtains an icon image at the timing when the OS 1053 generates a print queue and the print setting extension application 1052 obtains an icon image at the two timings described above has been given. The print setting extension application 1052 may obtain an icon image at any one of the two timings described above. For example, the print setting extension application 1052 may obtain an icon image of a printer corresponding to a print queue linked with the application only at the timing when the print setting extension application 1052 is started from a list of applications. At the timing when a printer is selected, a print setting extension application linked with a print queue corresponding to the printer may obtain an icon image of the printer, and the print setting extension application need not obtain an icon image at other timings.

When the above-described process is performed, on both screens provided by the print setting extension application 1052 and the OS 1053, an icon image provided by the cloud-print-supporting printer 201 can be used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-020519, filed Feb. 14, 2023, which is hereby incorporated by reference herein in its entirety.

What is claimed is:

1. A control method implemented by executing an application that is stored in an information processing apparatus and that provides a print setting screen for allowing a user to set print settings used when a driver in the information processing apparatus generates a print command to be provided for printing at a printer, the control method comprising:
   receiving an event from an operating system of the information processing apparatus;
   obtaining, in response to the event being received in the receiving, information about a location where data of an icon indicating the printer is stored, from an external apparatus different from the information processing apparatus via a network;
   obtaining an icon image on the basis of the obtained information about the location; and
   causing a display of the information processing apparatus to display the obtained icon image.

2. The control method according to claim 1, wherein the driver is a standard driver provided as one function of the operating system of the information processing apparatus.

3. The control method according to claim 2, wherein the standard driver is a driver compatible with a plurality of models of printers from a plurality of vendors.

4. The control method according to claim 1, wherein the driver provides the print command via a print server system present between the printer and the information processing apparatus.

5. The control method according to claim 4, wherein
   the driver provides the print command via a print server system present between the printer and the information processing apparatus, and
   the information about the location is a link transmitted from the printer via the print server system.

6. The control method according to claim 1, wherein the information about the location is a link transmitted by using an attribute printer-static-resource-directory-uri in Internet Printing Protocol.

7. A non-transitory computer-readable storage medium storing an application that provides a print setting screen for allowing a user to set print settings used when a driver in an information processing apparatus generates a print command to be provided for printing at a printer, the application including instructions configured to be executed by one or more processors to implement a control method comprising:

receiving an event from an operating system of the information processing apparatus;

obtaining, in response to the event being received in the receiving, information about a location where data of an icon indicating the printer is stored, from an external apparatus different from the information processing apparatus via a network;

obtaining an icon image on the basis of the obtained information about the location; and causing a display of the information processing apparatus to display the obtained icon image.

8. An information processing apparatus storing an application that provides a print setting screen for allowing a user to set print settings used when a driver generates a print command to be provided for printing at a printer, the information processing apparatus comprising:

a controller configured to:

receive an event from an operating system of the information processing apparatus;

obtain, in response to the event being received, information about a location where data of an icon indicating the printer is stored, from an external apparatus different from the information processing apparatus via a network;

obtain an icon image on the basis of the obtained information about the location; and cause a display of the information processing apparatus to display the obtained icon image.

* * * * *